(12) United States Patent
Kanazawa

(10) Patent No.: US 8,181,136 B2
(45) Date of Patent: May 15, 2012

(54) CIRCUIT OPERATION VERIFICATION METHOD AND APPARATUS

(75) Inventor: Yuzi Kanazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 678 days.

(21) Appl. No.: 12/358,060

(22) Filed: Jan. 22, 2009

(65) Prior Publication Data

US 2009/0300564 A1 Dec. 3, 2009

(30) Foreign Application Priority Data

May 29, 2008 (JP) ................................. 2008-141572

(51) Int. Cl.
*G06F 17/50* (2006.01)
(52) U.S. Cl. ........................................ 716/111; 716/112
(58) Field of Classification Search .......... 716/111–112, 716/136
See application file for complete search history.

(56) References Cited

U.S. PATENT DOCUMENTS

| 6,318,911 | B1 | 11/2001 | Kitahara |
| 7,747,971 | B1 * | 6/2010 | Chopra et al. ................. 716/136 |

FOREIGN PATENT DOCUMENTS

JP   A 2003-330988   11/2003

* cited by examiner

*Primary Examiner* — Nghia Doan
*Assistant Examiner* — Binh Tat
(74) *Attorney, Agent, or Firm* — Greer, Burns & Crain, Ltd.

(57) ABSTRACT

In order to confirm a propagation range of a signal whose signal value is fixed by a control signal to restrain switchings is within a predetermined range, it is judged by results of the logic simulation whether or not a switching restraining mode is enabled. If it is enabled, a switching probability restraint information list including the detected time and an ID of the net whose signal value is fixed is set to the net whose signal value is fixed, and then is propagated to the next net according to the results of the logic simulation. If the circuit changes are appropriated conducted, the results of the logic simulation do not satisfy the propagation condition of the switching probability restraint information list. Accordingly, the switching probability restraint information list is not propagated over the predetermined range, and no problem is detected.

7 Claims, 31 Drawing Sheets

| CONTROL SIGNAL NET | CONTROL SIGNAL VALUE IN SWITCHING RESTRAINING MODE | SWITCHING RESTRAINED NET |
|---|---|---|
| NET A | 1 | NET B |
| NET C | 0 | NET D |
| NET E | 1 | NET F |
| ⋮ | ⋮ | ⋮ |

|  | FLAG | COUNT VALUE | SIGNAL VALUE |
| --- | --- | --- | --- |
| NET 1 | 1 | 2 | 1 |
| NET 2 | 0 | 0 | 0 |
| NET 3 | 0 | 0 | 1 |
| ⋮ | ⋮ | ⋮ | ⋮ |

FIG.17A

| CONTROL SIGNAL NET | CONTROL SIGNAL VALUE IN SWITCHING RESTRAINING MODE | SWITCHING RESTRAINED NET | COUNT VALUE |
| --- | --- | --- | --- |
| NET A | 1 | NET B | 2 |
| NET C | 0 | NET D | 0 |
| NET E | 1 | NET F | 1 |
| ⋮ | ⋮ | ⋮ | ⋮ |

FIG.17B

CASE OF 3-INPUT
AND CIRCUIT
PROPAGATION
CONDITION FOR A→X
B == 1
C == 1
PROPAGATION
CONDITION FOR B→X
A == 1
C == 1
FIG.20A
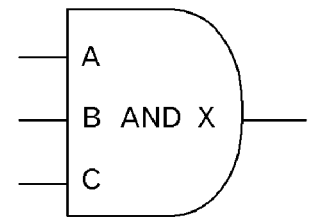
FIG.20B
CASE OF MUX
PROPAGATION
CONDITION FOR $I_0$→X
S == 0
PROPAGATION
CONDITION FOR $I_1$→X
S == 1
.
.
FIG.21A
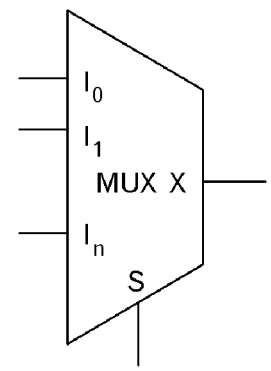
FIG.21B

| FF1_2_EN | 0 | FF1_out |
| FF1_2_EN | 0 | FF2_out |
| FF3_4_EN | 0 | FF3_out |
| FF3_4_EN | 0 | FF4_out |

CIRCUIT OPERATION VERIFICATION METHOD AND APPARATUS

CROSS-REFERENCE TO RELATED APPLICATIONS

This application is based upon and claims the benefit of priority of the prior Japanese Patent Application No. 2008-141572, filed on May 29, 2008, the entire contents of which are incorporated herein by reference.

FIELD

The embodiments herein relate to a technique for carrying out operational verification for a verification target circuit including circuit changes added in order to reduce the power consumption.

BACKGROUND

Changes to suppress the switching probability of circuits are conducted in order to reduce the power consumption of the semiconductor chip. However, the logic behavior of the entire circuit must not be changed as a matter of course. Therefore, in the conventional arts, logic simulation may be carried out to confirm whether or not the operation of the circuit before the changes is identical to the operation of the circuit after the changes, or formal verification may be carried out. Incidentally, although various design techniques to reduce the power consumption exists, there is no technique to verify the circuit changes conducted in order to reduce the power consumption.

As for the conventional arts, it is necessary for the designer to describe identicalness conditions for the respective changes in order to judge whether or not the operation of the circuit after the changes is identical to the operation of the circuit before the change. This makes the designer's load large. In addition, when the circuit before the change is modified due to bugs or the like, it is necessary to modify both of the circuits before and after the change. This also makes the designer's load large.

SUMMARY

Therefore, an object of the embodiments is to provide a new technique to carry out the operation verification for the verification target circuit including the circuit changes conducted in order to reduce the power consumption while also reducing the designer's load.

This circuit operation verification method includes, based on logic simulation results for an operation verification target circuit to which a control circuit instructing a switching restraining mode to a specific circuit, identifying, from a control signal data storage device storing an ID of a control signal net through which a control signal to instruct the switching restraining mode is transmitted, a signal value of the control signal, by which the switching restraining mode is enabled, and an ID of a switching restrained net through which a signal directly influenced by enabling the switching restraining mode is transmitted, in association each other, a switching restrained net for which the signal value of the control signal of the control signal net at a specific time is a signal value by which the switching restraining mode is enabled, and which corresponds to the pertinent control signal net, and setting a switching probability restraint information list including the ID of the switching restraining net and the specific time to the identified switching restrained net; identifying, from a propagation condition data storage device storing, for each type of the circuit, a propagation condition by which the switching probability restraint information list set for an input side net of the circuit is propagated to an output side net of the circuit, a propagation condition for a type of a specific circuit whose input side net is a net for which the switching probability restraint information list is set, and judging whether or not the results of logic simulation satisfy the identified propagation condition, and propagating the switching probability restraint information list set for the input side net to the output side net of the specific circuit, upon detecting that the results of the logic simulation satisfy the identified propagation condition; and judging whether or not the specific time included in the switching probability restraint information list propagated to the output side net of the specific circuit is a time prior to a predetermined time or more from the present time, and upon detecting that the specific time is a time prior to the predetermined time or more from the present time, outputting an error.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 17A is a diagram depicting an example of data stored in a signal change count value storage;

FIG. 17B is a diagram depicting an example of data stored in a switching restraint count value storage;

FIG. 20A is a diagram depicting a data example of a propagation condition list for a 3-input AND circuit, and FIG. 20B is a diagram depicting a structural example of the 3-input AND circuit;

FIG. 21A is a diagram depicting a data example of the propagation condition list for a multiplexer, and FIG. 21B is a diagram depicting a structural example of the multiplexer;

DESCRIPTION OF EMBODIMENTS

[Outline of Embodiments]

In the embodiments, even when the logic verification of the changes conducted in order to reduce the power consumption is carried out, it is judged whether or not appropriate logic changes were made, by judging whether or not a propagation range of a signal whose signal value is fixed in order to reduce the power consumption, that is, lower the switching probability, is within a predetermined range, without confirming whether or not the operation after the changes is the same as the operation before the changes.

Figure 1:
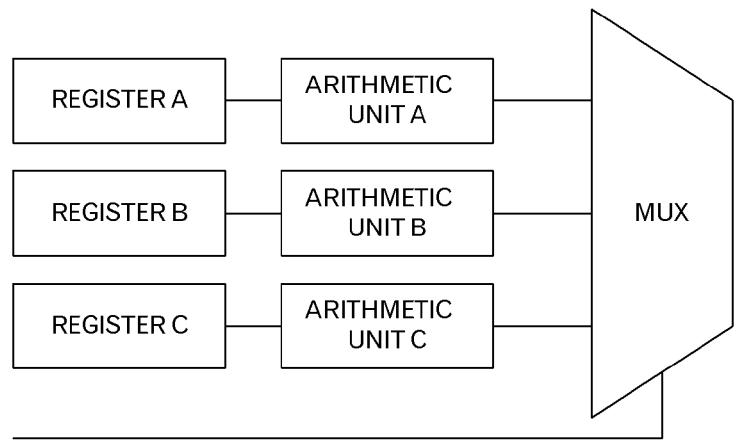
FIG. 1 is a diagram depicting an example of a circuit for which changes should be carried out in order to reduce the power consumption.
Figure 2:
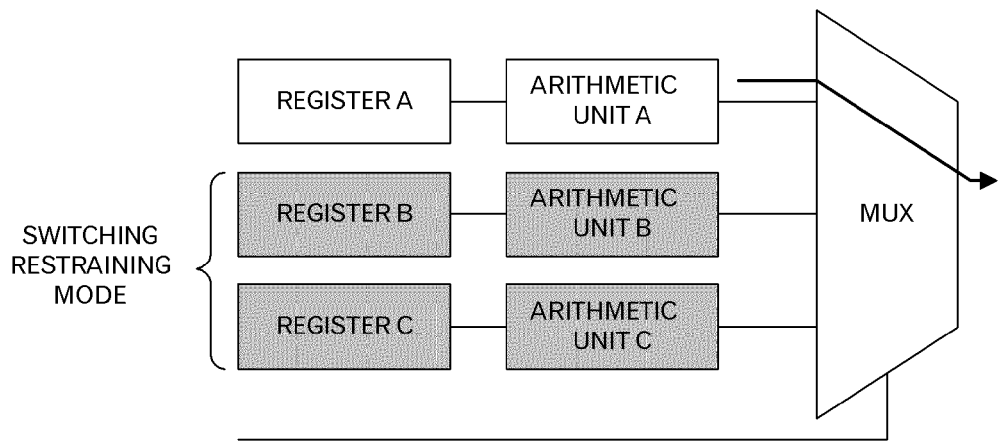
FIG. 2 is a diagram to explain a switching restraining mode.

For example, a circuit as depicted in FIG. 1 is considered. In the circuit in FIG. 1, values in a register A are processed by an arithmetic unit A, values in a register B are processed by an arithmetic unit B, values in a register C are processed by an arithmetic unit C, and a multiplexer (MUX) selects one of outputs of the arithmetic units A to C. Here, when it is known that only the output of the arithmetic unit A is selected by the multiplexer, it is preferable in order to lower the switching probability that the registers B and C and the arithmetic units B and C are in a switching restraining mode, as depicted in FIG. 2. Then, in the embodiments, it is not confirmed that the output of the arithmetic unit A is transmitted through the multiplexer and correctly processed, but it is confirmed that the outputs of the arithmetic units B and C in the switching restraining mode is not transmitted through the multiplexer and do not influence other circuits. Namely, it is confirmed that the outputs of the arithmetic units B and C disappear within a predetermined cycles (one cycle in the example of FIG. 2).

Figure 3:
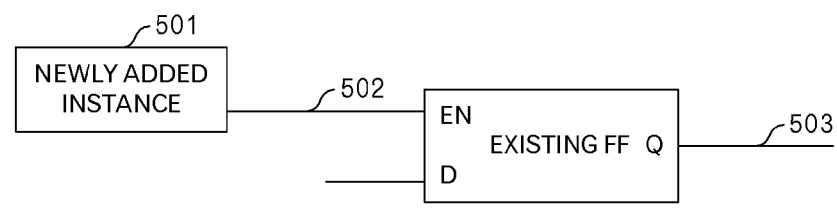
FIG. 3 is a diagram to explain a control signal net and a switching restrained net.

Incidentally, the propagation stop of the signal is carried out not only by the multiplexer but also a gate operation of AND, OR, Flip Flop (FF) or the like. That is, the outputs of these circuits are fixed in the switching restraining mode. Typically, as depicted in FIG. 3, an output of a newly added instance 501, which instructs the switching restraining mode, is connected to the EN terminal of an existing FF through a net 502, and a control signal (=0) is outputted to the EN terminal of the existing FF from the newly added instance 501 through the net 502. Thus, an output value of the Q terminal of the existing FF is fixed regardless of an input value to the D terminal. In the embodiments, the net 503 connected to the Q terminal of the existing FF is called "switching restrained net".

Similarly, the output of the existing instance is connected to an input of the newly added AND circuit, an output of the newly added instance 511 is also connected to the input of the newly added AND circuit through a net 512, and a control signal (=0) is inputted from the newly added instance 511 through the net 512 to the newly added AND circuit. Thus, the output of the newly added AND circuit is fixed regardless of the value of the output of the existing instance. Namely, the net 514 connected to the output of the newly added AND circuit is a switching restrained net.

In the embodiments, when the switching restraining mode is enabled, a switching probability restraint information list described below is generated and attached to the switching restrained net, and by propagating the switching probability restraint information list according to the net connection relation, it is judged whether or not the propagation range of the signal whose value is fixed in order to lower the switching probability is within a predetermined range.

Figure 5:
FIG. 5 is a diagram to explain propagation of a switching probability restraint information list.

Specifically, as depicted in FIG. 5, at a cycle next to a cycle when the signal value of the control signal outputted through the net 502 became "0", the switching probability restraint information list is set to the switching restrained net 503. The switching probability restraint information list includes the cycle number (here, n) corresponding to a time when the switching is restrained and a net ID (here, xxxxx) of a net for which this switching probability restraint information list is firstly set (i.e. departed). A state in which this switching probability restraint information list has been set represents that the value in the net after the changes is different from the value in the net before the changes.

Figure 6:
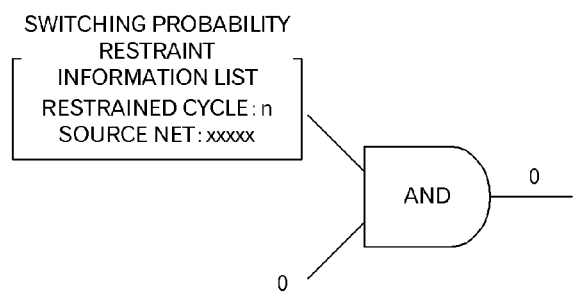
FIG. 6 is a diagram to explain the propagation of the switching probability restraint information list.

The propagation of this switching probability restraint information list will be explained by using FIGS. 6 to 8. That is, for example, as depicted in FIG. 6, the switching probability restraint information list is set to one input of the AND circuit, and when the other input represents "0" as the result of the logic simulation, the output of the AND circuit always becomes "0". In such a case, the switching probability restraint information list is not propagated to a net connected with the output of the AND circuit.

Figure 7:
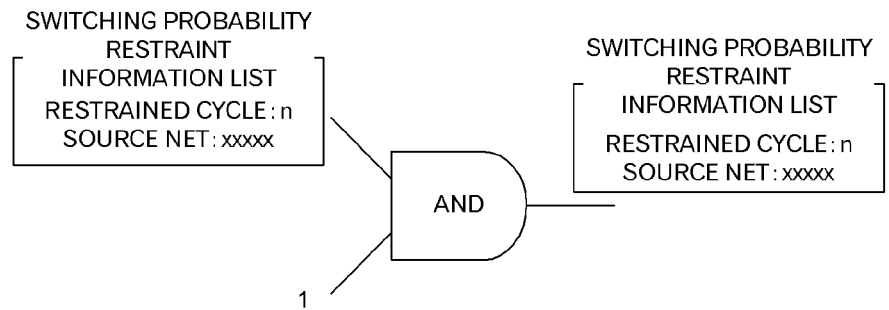
FIG. 7 is a diagram to explain the propagation of the switching probability restraint information list.

On the other hand, as depicted in FIG. 7, when the other input of the AND circuit is "1" as the result of the logic simulation, the signal value of the net for which the switching probability restraint information list is set is propagated to the output of the AND circuit as it is. Therefore, the switching probability restraint information list is also propagated to the output of the AND circuit.

Figure 8:
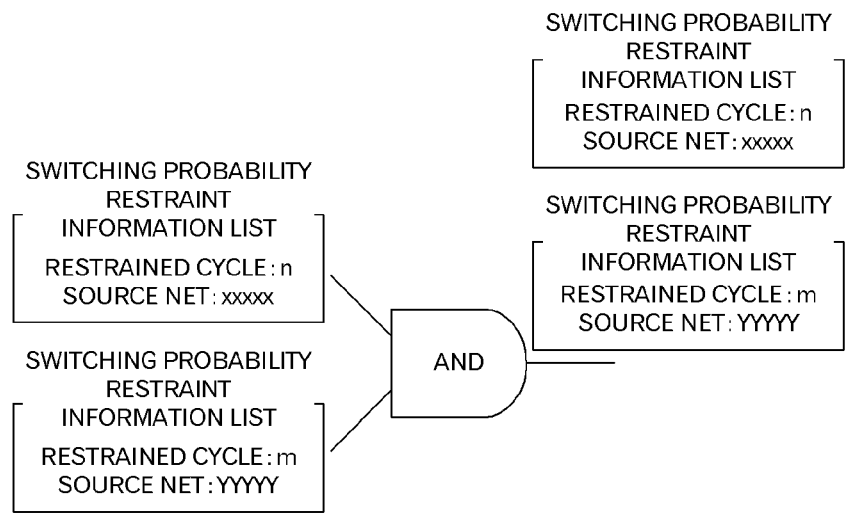
FIG. 8 is a diagram to explain the propagation of the switching probability restraint information list.

Furthermore, as depicted in FIG. 8, when the different switching probability restraint information lists are set to both of the inputs of the AND circuit, both of the switching probability restraint information lists are propagated to the output of the AND circuit, because it is unknown whether the input values of the AND circuit are originally "0" or "1". Namely, two switching probability restraint information list are propagated to the net connected to the output of the AND circuit. However, actually, two or more switching probability restraint information lists may be set to the net.

Figure 9:
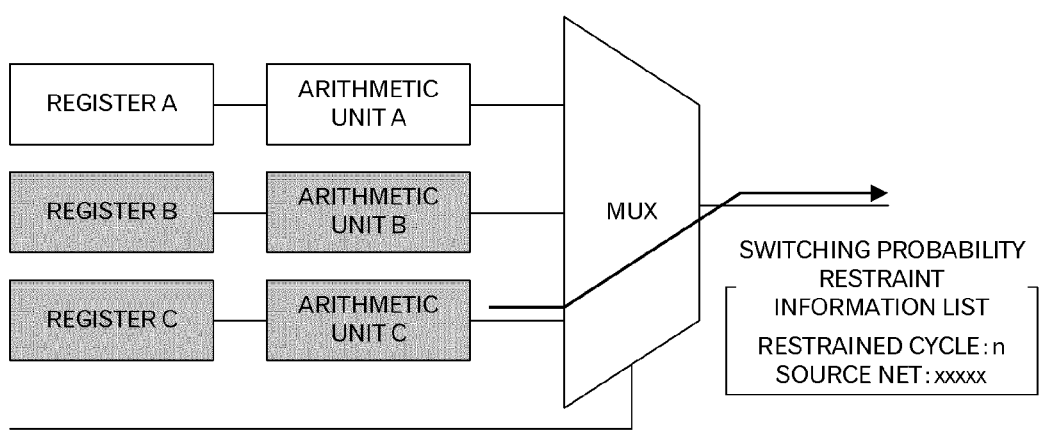
FIG. 9 is a diagram to explain an error judgment in embodiments.

Thus, when the switching restraining mode is enabled, the switching probability restraint information list is set to the switching restrained net, and the switching probability restraint information list is propagated along the net according to the result of the logic simulation. When there is no problem for the changes conducted in order to reduce the power consumption, the propagation is end as depicted in FIG. 6 and the switching probability restraint information list disappears within a predetermined cycle L even if the switching probability restraint information list was set. However, when there is a problem for the changes conducted in order to reduce the power consumption, the switching probability restraint information list remains in either net even if the predetermined cycle L passed. Because this represents the operation of the circuit after the changes has varied, an alert is outputted to the user (i.e. designer) by outputting the pertinent switching probability restraint information list. In the example of FIG. 2, as depicted in FIG. 9, when the operation of the multiplexer is incorrectly recognized so as to select the output of the arithmetic unit C, the output of the arithmetic unit C in the switching restraining mode is selected and outputted by the multiplexer. Then, the switching probability restraint information list, which was set because the arithmetic unit C is in the switching restraining mode, is propagated over the multiplexer. In such a case, an error is outputted, because it can be understood that the changes to the circuit are not appropriate.

Because the switching probability restraint information list includes the cycle number of the cycle at which the switching of the circuit is restrained and data of the net ID of the source net, the life period of the switching probability restraint information list can be easily calculated, and it can be easily judged which circuit causes the problem when the problem is detected.

[Specific Contents of Embodiments]

Figure 10:
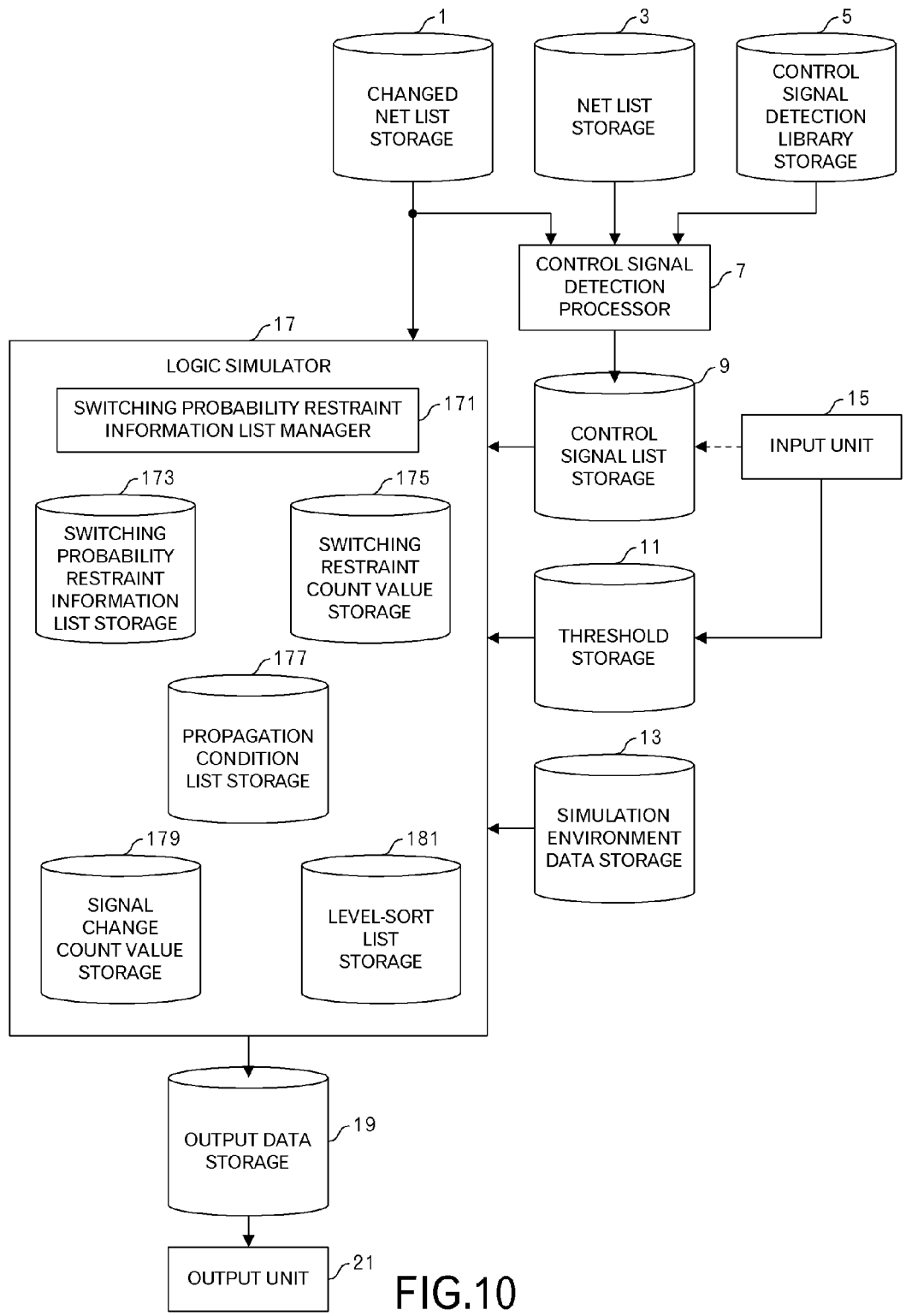
FIG. 10 is a functional block diagram of a verification system relating to the embodiments.

FIG. 10 depicts a functional block diagram of a verification system relating to one embodiment. The verification system relating to this embodiment has a changed net list storage 1 that stores a net list after the changes conducted in order to reduce the power consumption; a net list storage 3 that stores a net list before the changes conducted in order to reduce the power consumption; a control signal detection library storage 5 that stores libraries to detect the aforementioned control signals and the like; a control signal detection processor 7 that carries out a control signal detection processing by using data stored in the changed net list storage 1, the net list storage 3 and the control signal detection library storage 5; an input unit 15 that accepts input of various data from a user; a control signal list storage 9 that stores data of the control signal lists from the control signal detection processor 7 or the input unit 15; a threshold storage 11 that stores the maximum number L of cycles, which is a threshold for the error output; a simulation environment data storage 13 that stores environment data for the logic simulation such as data in the initial state, outside input values and the like; a logic simulator 17 that carries out a main processing in this embodiment by using data stored in the changed net list storage 1, the control signal list storage 9, the threshold storage 11 and the simulation environment data storage 13; an output data storage 19 that stores the processing result of the logic simulator 17, which is particular to this embodiment; and an output unit 21 that outputs data stored in the output data storage 19.

The logic simulator 17 has a switching probability restraint information list manager 171, a switching probability restraint information list storage 173 that stores the switching probability restraint information list, a switching restraint count value storage 175 that stores a switching restraint count value, a propagation condition list storage 177 that stores list data for propagation conditions to propagate the switching probability restraint information list, a signal change count value storage 179 the stores a signal change count value, and a level sort list storage 181 that stores a level-sort list, which is a result of a level-sorting by the combinational circuit by the logic simulator 17.

The net lists stored in the changed net list storage 1 and the net list storage 3 are the same as that in the conventional art. Therefore, the detailed explanation is omitted.

Figure 4:
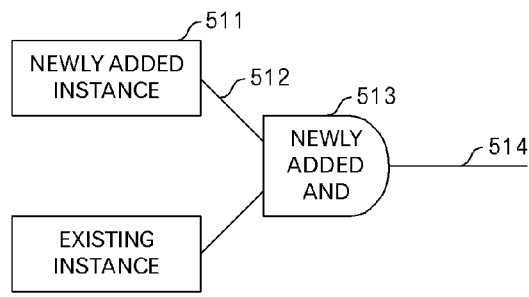
FIG. 4 is a diagram to explain the control signal net and the switching restrained net.

Data stored in the control signal detection library storage is data as depicted in FIGS. 3 and 4, for example. Namely, as depicted in FIG. 3, a pattern that the newly added instance 501 is connected to the EN terminal of the existing FF is registered. Furthermore, in case of such a pattern, the net 502 is a control signal net, the value of the control signal relating to the switching restraining mode is "0", and data representing the net 503 connected to the Q terminal for the existing FF is the switching restrained net is registered in association with the aforementioned data. Namely, although it is described below, searching is carried out while comparing the net list stored in the changed net list storage 1 with the net list stored in the net list storage 3 and identifying the difference circuit as new circuits, and when the pattern as depicted in FIG. 3 is detected, an ID of the control signal net, a value of the control signal and an ID of the net that is the switching restrained net are outputted and stored into the control signal list storage 9.

In addition, as depicted in FIG. 4, a pattern is registered that a newly added AND circuit whose inputs are connected with an output of the existing instance and an output of the newly added instance 511 is provided. In case of such a pattern, data representing that the net 512 connected with the output of the newly added instance is a control signal net, a value of the control signal relating to the switching restraining mode is "0", and the net 514 connected to the output of the newly added AND circuit is registered in association with each other. Namely, although it is described below, searching is carried out while comparing the net list stored in the changed net list storage 1 with the net list stored in the net list storage 3 and identifying the difference circuit as new circuits, and when the pattern as depicted in FIG. 4 is detected, an ID of the control signal net, a value of the control signal and an ID of the net that is the switching restrained net are outputted and stored into the control signal list storage 9.

An ID of a net of the aforementioned control signal, a value of the control signal and an ID of net, which is the switching restrained net are stored into the control signal detection library storage 5 in association with the typical circuit patterns, which are introduced in order to reduce the power consumption in addition to FIGS. 3 and 4.

Figures 11, 13:
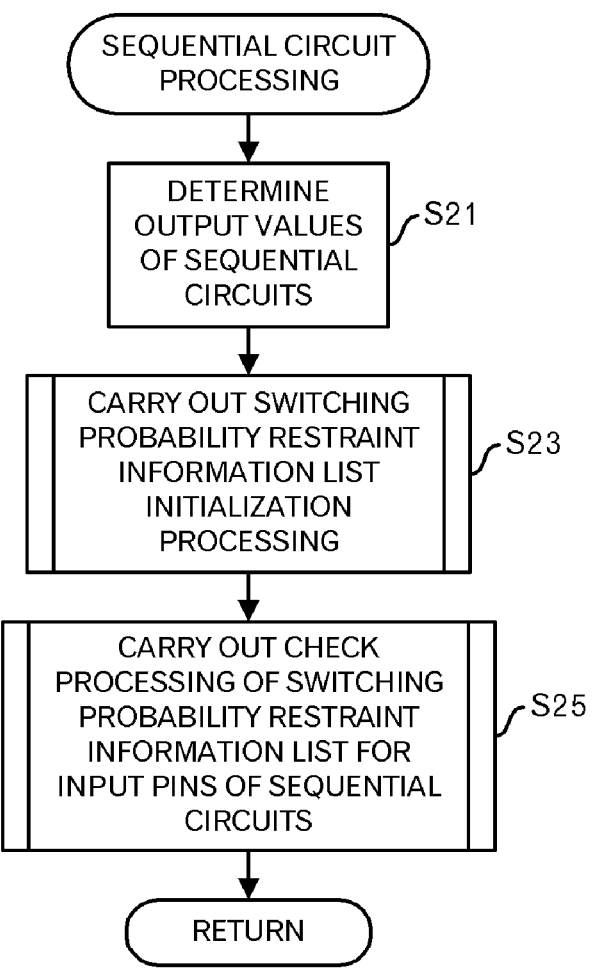
FIG. 11 is a diagram depicting an example of data stored in a control signal list storage.
FIG. 13 is a diagram depicting a processing flow of a sequential circuit processing.

Data stored in the control signal list storage 9 is data as depicted in FIG. 11, for example. In the example of FIG. 11, an ID of a net of the control signal, a control signal value in the switching restraining mode and an ID of the switching restrained net are registered.

Next, processing contents of the verification system depicted in FIG. 11 will be explained by using FIGS. 12 to 23. First, the control signal detection processor 7 carries out a control signal list generation processing by using data stored in the changed net list storage 1, the net list storage 3 and the control signal detection library storage 5, and stores data of a control signal list, which is a processing result, into the control signal list storage 9 (step S1). As explained by using FIGS. 3 and 4, in the control signal list generation processing, the net list stored in the changed net list storage 1 is compared with the net list stored in the net list storage 3 to identify the existing circuit and newly added circuits, and when a circuit pattern, which is identical with the circuit pattern (FIGS. 3 and 4) stored in the control signal detection library storage 5, is detected, the control signal value in the switching restraining mode, which is stored in the control signal detection library storage 5 in association with the circuit pattern, is read out to extract from the changed net list storage 1 and store into the control signal list storage 9, the ID of the pertinent control signal net and the ID of the switching restrained net.

Incidentally, instead of the step S1, the designer may operate the input unit 15 to store data of the control signal list into the control signal list storage 9. In addition, the maximum number L of cycles is inputted by the designer through the input unit 15 to store the value into the threshold storage 11.

Furthermore, the logic simulator 17 carries out a level sorting for all of the combinational circuit instances included in the net list stored in the changed net list storage 1, by using a well-known method, and stores the level sort list as the processing result, into the level sort list storage 181 (step S5). The level sorting, which is a processing to identify the determination orders of the output values of the combinational circuits, is well-known, and is not a main portion of the embodiments. Hence, the further explanation is not omitted.

In addition, the logic simulator 17 initializes a cycle T to "0" (step S7), and reads out and sets necessary data from the simulation environment data storage 13. Then, the logic simulator 17 judges whether or not the termination condition of the logic simulation is satisfied (step S9). When the termination condition is not satisfied, the logic simulator 17 increments the cycle T by "1" (step S11).

Then, the logic simulator 17 carries out a sequential circuit processing for all of the sequential circuit instances stored in the changed net list storage 1 (step S13). The sequential circuit processing will be explained by using FIGS. 13 to 21.

The logic simulator 17 determines an output value of each sequential circuit by carrying out a well-known logic simulation (step S21). Of course, the output value of each sequential circuit is stored into a memory of the logic simulator 17. Then, the logic simulator 17 carries out a switching probability restraint information list initialization processing for the sequential circuit (step S23). This switching probability restraint information list initialization processing will be explained by using FIGS. 14 to 17B.

First, the switching probability restraint information list manager 171 of the logic simulator 17 identifies one unprocessed net connected to an output pin of either sequential circuit (incidentally, the sequential circuit in the switching probability restraint information list initialization processing for the sequential circuit, and the combinational circuit in the switching probability restraint information list initialization processing for the combinational circuit) included in the net list stored in the changed net list storage 1 (step S31). Then, the switching probability restraint information list manager 171 refers to the switching probability restraint information list storage 173 to confirm, for the identified net, whether or not the switching probability restraint information list in the previous cycle has been registered in the switching probability restraint information list storage 173, deletes the switching restraint information list if it has been registered, and sets a flag for the identified net in the signal change count value storage 179 (step S33). At this step, when the switching probability restraint information list exists, which was generated or propagated in the previous cycle, the switching probability restraint information list is deleted as unnecessary data at this step, because the propagation to the subsequent circuits connected to the identified net has been completed.

Figure 15:
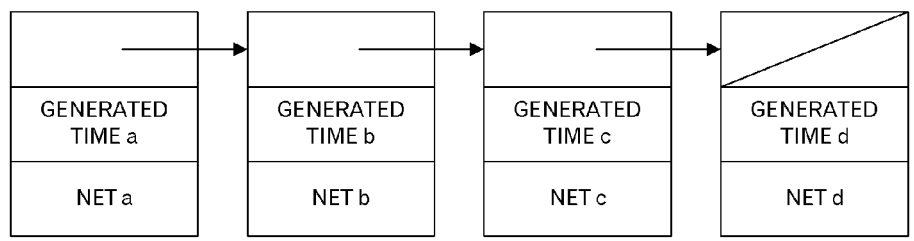
FIG. 15 is a diagram depicting a data structure example of the switching probability restraint information list, which can be set for one net.
Figure 16:
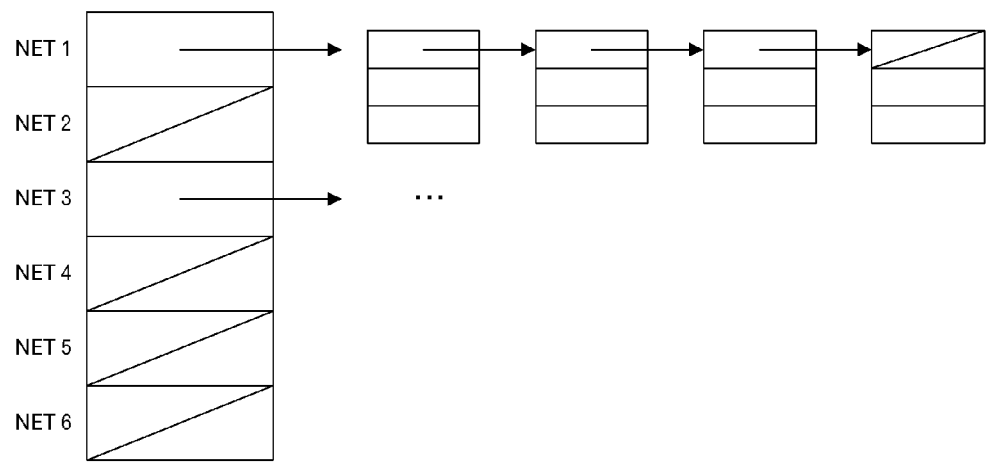
FIG. 16 is a diagram depicting the entire data structure example of the switching probability restraint information list.

Incidentally, the switching probability restraint information list storage 173 has a data structure as depicted in FIGS. 15 and 16. FIG. 15 depicts a list structure for one net. Namely, as described above, each switching probability restraint information list includes a cycle number of a cycle when the restraint was carried out, namely, a generation time, and a net ID of a source net. However, when plural switching probability restraint information list for the same net are set, the lists are chained by the pointers as depicted by the arrow in FIG. 15. In addition, FIG. 16 depicts the entire data structure in the switching probability restraint information list storage 173. However, for each net, a region to store the pointer to the head of the list structure depicted in FIG. 15 is provided. By such data structure, the switching probability restraint information list for each net is managed.

At the step S33, in the data structure as depicted in FIGS. 15 and 16, it is confirmed whether or not the pointer to the switching probability restraint information list is set to the pertinent net, and if it is confirmed, the point to the switching probability restraint information list is deleted.

In addition, FIG. 17A depicts an example of data stored in the signal change count value storage 179. In the example of FIG. 17A, for each net, a flag, a count value, which is counted later, and a signal value are registered. In the embodiments, because the possibility that any logical failure occurs is high for such a net that the signal value is frequently transitioned although the switching probability restraint information list consecutively exists, data as depicted in FIG. 17A is held in order to notify the designer of that circuit portion and request the confirmation. Namely, when "1" is set to the flag when the switching probability restraint information list existed in the previous cycle, the flag is stored in order to confirm whether or not the signal transition occurred for the signal value. Then, when "1" is set to the flag and it is confirmed that the switching probability restraint information list is set at this step and the signal value transitions, the count value is incremented by "1".

Incidentally, when it is judged at the step S33 that the switching probability restraint information list in the previous cycle does not exist, the switching probability restraint information list is not deleted and the flag is not set, of course.

Figure 14:
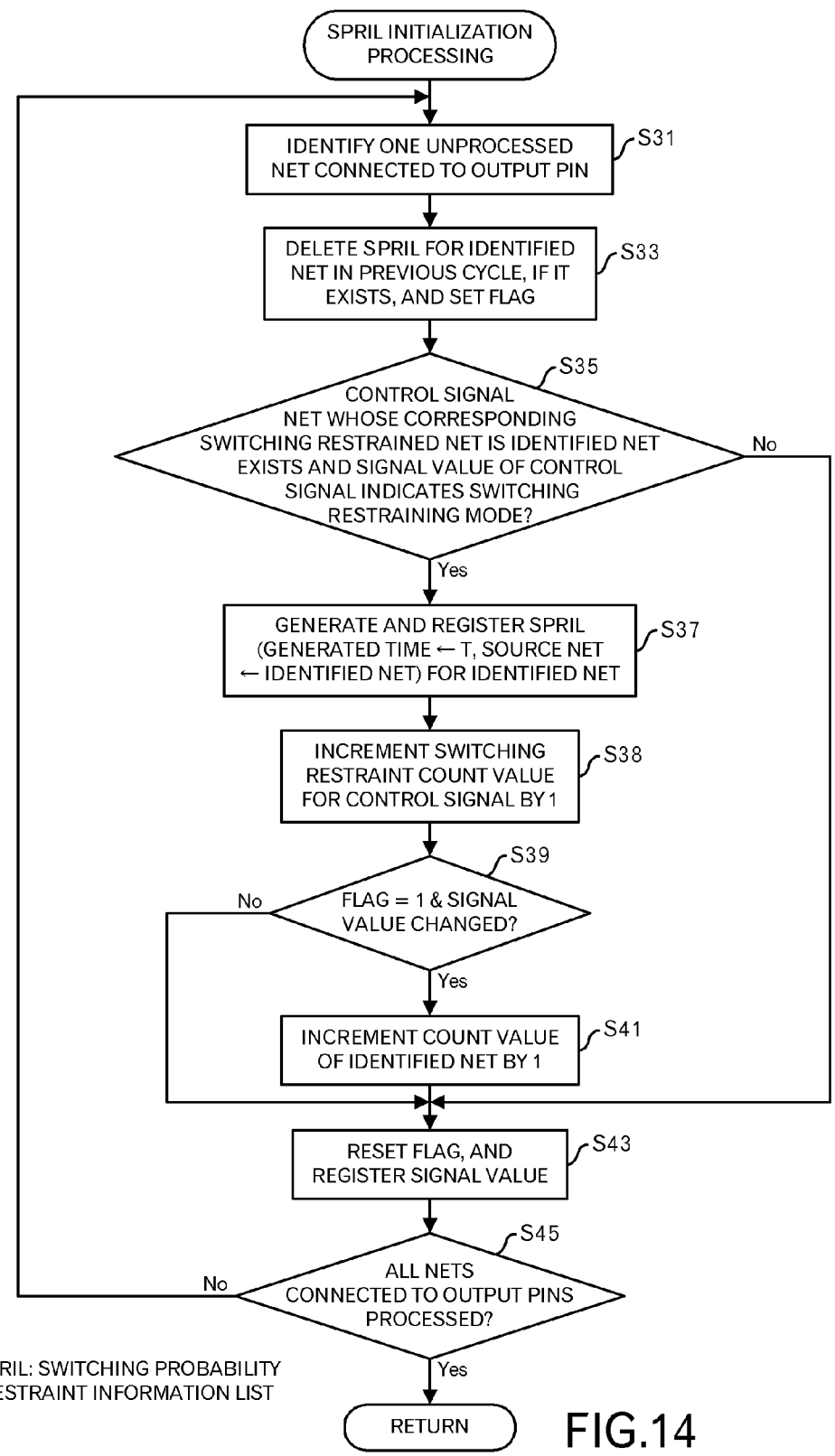
FIG. 14 is a diagram depicting a processing flow of a switching probability restraint information list initialization processing.

Returning to the explanation of FIG. 14, the switching probability restraint information list manager 171 searches the control signal list storage 9 to confirm whether or not the control signal net whose corresponding switching restrained net is the identified net exists, and when the control signal exists, the switching probability restraint information list manager 171 judges whether or not the signal value of the control signal net is the signal value registered in the pertinent record of the control signal list storage 9, namely the signal value instructing the switching restraining mode (step S35). For example, in the example of FIG. 11, when the identified net is "netB", the pertinent record (the first record) exists in the control signal list storage 9, and the control signal net is identified as "netA". Then, it is judged whether or not the signal value of "netA" as the result of the logic simulation by the logic simulator 17 is the control signal value "1" of the switching restraining mode in the pertinent record in the control signal list storage 9. When the signal value of "netA" is "1", it is confirmed that the switching restraining mode is enabled. Therefore, it is necessary to set the switching restraint information list for the identified net.

Therefore, when the control signal net whose corresponding switching restrained net is the identified net exists and the signal value of the control signal net is not identical to the signal value registered in the pertinent record of the control signal list storage 9, the processing shifts to step S43.

On the other hand, when the control signal net whose corresponding switching restrained net is the identified net exists and the signal value of the control signal net is identical to the signal value registered in the pertinent record of the control signal list storage 9, the switching probability restraint information list manager 171 generates a switching probability restraint information list for the identified net, and sets it in the switching probability restraint information list storage 173 (step S37). In the switching probability restraint information list generated here, the present cycle number T is set as the generation time, and the ID of the identified net is set as the ID of the source net.

Then, the switching probability restraint information list manager 171 increments the count value in the record whose corresponding switching restrained net is the identified net, by "1", and registers the incremented count value in the switching restraint count value storage 175 (step S38). At this step, for each net relating to the control signal, the number of times of the switching restraining mode and the number of times that the propagation condition described below is satisfied are counted. This is carried out in order to estimate the upper limit of the switching probability restraint effect. The switching restraint count value storage 175 stores data as depicted in FIG. 17B, for example. In the example of FIG. 17B, the count value is stored in addition to data of the control signal list, which is stored in the control signal list storage 9, as depicted in FIG. 11.

Then, the switching probability restraint information list manager 171 refers to the record for the identified net in the signal change count value storage 179 to judge whether or not "1" is set to the flag and the registered signal value is different from the signal value in the present cycle (step S39). As described in association with FIG. 17A, because there is possibility that any problem exists when the signal value frequently transitions although the switching probability restraint information list consecutively exists, the condition for this purpose is confirmed.

When "1" is not set to the flag, or when the signal value does not transition, the processing shifts to the step S43.

On the other hand, when "1" is set to the flag and the transition of the signal value occurs, the switching probability restraint list manager 171 increments the count value for the identified net by "1", and registers the incremented count value in the signal change count value storage 179 (step S41).

After that, the switching probability restraint information list manager 171 resets the flag for the identified net, and registers the signal value in the present cycle for the identified net in the signal change count value storage 179 (step S43).

Then, the switching probability restraint information list manager 171 judges whether or not all nets connected to the output pin of either sequential circuit (sequential circuit in the processing for the sequential circuit, and combinational circuit in the processing for the combinational circuit) have been processed (step S45), and when the unprocessed net still exists, the processing returns to the step S31. On the other hand, when all nets connected to the output pin of either sequential circuit (sequential circuit in the processing for the sequential circuit, and combinational circuit in the processing for the combinational circuit) have been processed, the processing returns to the original processing.

By carrying out such a processing, generation, setting and deletion of the switching probability restraint information list necessary for the sequential circuit can be carried out, and the signal transition, which may cause any problem, can be identified and the number of times of the signal transition can be counted.

Returning to the explanation of the processing in FIG. 13, the logic simulator 17 carries out a check processing of the switching probability restraint information list for the input pin of the sequential circuit (step S25). The check processing of the switching probability restraint information list for the input pin of the sequential circuit will be explained by using FIGS. 18 to 21.

The switching probability restraint information list manager 171 identifies one unprocessed net connected to an input pin of either sequential circuit (step S51).

Then, the switching probability restraint information list manager 171 refers to the switching probability restraint information list storage 173 to judge whether or not the switching probability restraint information list is set to the identified net (step S52). When the switching probability restraint information list is not set to the identified net, the processing shifts to step S63.

On the other hand, when the switching probability restraint information list is set to the identified net, the switching probability restraint information list manager 171 carries out a propagation condition confirmation processing (step S53). This propagation condition confirmation processing will be explained by using FIGS. 19 to 21. First, the switching probability restraint information list manager 171 identifies a cell connected to an input pin of the net identified at the step S51 from the net list stored in the changed net list storage 1, and identifies a related propagation condition list from the propagation condition list storage 177 (step S71).

In the embodiments, the switching probability restraint information list is not propagated when the signal value of the output pin of the cell does not change, and the switching probability restraint information list is propagated when the signal value of the output pin of the cell changes. In order to carry out such judgment, data of the condition to propagate the switching probability restraint information list for each type of the cell is prepared and stored into the propagation condition list storage 177 in advance. The propagation condition list storage 177 stores data as depicted in FIG. 20A and FIG. 21A, for example. FIG. 20A depicts the propagation condition in a case of a three-input AND circuit, as depicted in FIG. 20B. Namely, in a case of the three-input AND circuit, the switching probability restraint information list of the input pin A is propagated to the output pin X when both of the signal values of the other input pins B and C are "1". In addition, the switching probability restraint information list of the input pin B is propagated to the output pin X, when both of the signal values of the other input pins B and C are "1". Such data is registered in the propagation condition list. However, when a net for which the switching probability restraint information list is set is connected to the input pin designated by the condition, it is judged that the condition for the input pin is satisfied, because the signal value may be "0" or "1".

FIG. 21A depicts the propagation condition in a case of the multiplexer as depicted in FIG. 21B. That is, the switching probability restraint information list of the input pin $l_0$ of the multiplexer is propagated to the output pin X when the signal value of the selector pin S is "0". The switching probability restraint information list of the input pin $l_1$ of the multiplexer is propagated to the output pin X, when the signal value of the selector pin S is "1". Data for the other input pins is also registered as the propagation condition list.

Data of the propagation condition list is also registered for each cell type other than this, and the pertinent propagation condition list is read out at the step S71.

Then, the switching probability restraint information list manager 171 obtains the value of each input pin of the identified cell from the result of the logic simulation (step S73). Then, the switching probability restraint information list manager 171 judges based on the value of each input pin whether or not the propagation condition in the propagation condition list is satisfied (step S75). It is judged based on data as depicted in FIGS. 20A and 21A and the value of each input pin whether or not the propagation condition is satisfied. However, after all possible combinations of the inputs is tried to identify the output value, it may be confirmed without using data of the propagation condition list storage 177, whether or not the output value is changed.

When it is judged at the step S75 that the propagation condition is satisfied (step S77: Yes route), the switching probability restraint information list manager 171 returns "True" to the original processing as the processing result of the propagation condition confirmation processing (step S79), and the processing returns to the original processing.

On the other hand, when it is judged at the step S75 that the propagation is not satisfied (step S77: No route), the switching probability restraint information list manager 171 judges whether or not any unprocessed propagation condition exists among the propagation conditions identified at the step S71 (step S83). When the unprocessed propagation condition exists, the switching probability restraint information list manage 171 identifies the unprocessed propagation condition (step S85), and the processing returns to the step S75, and a processing for the identified propagation condition is carried out.

In addition, when no unprocessed propagation condition exists, the switching probability restraint information list manager 171 returns "False" to the original processing as the processing result of the propagation condition confirmation processing to the original processing (step S87), and the processing returns to the original processing.

Figure 18:
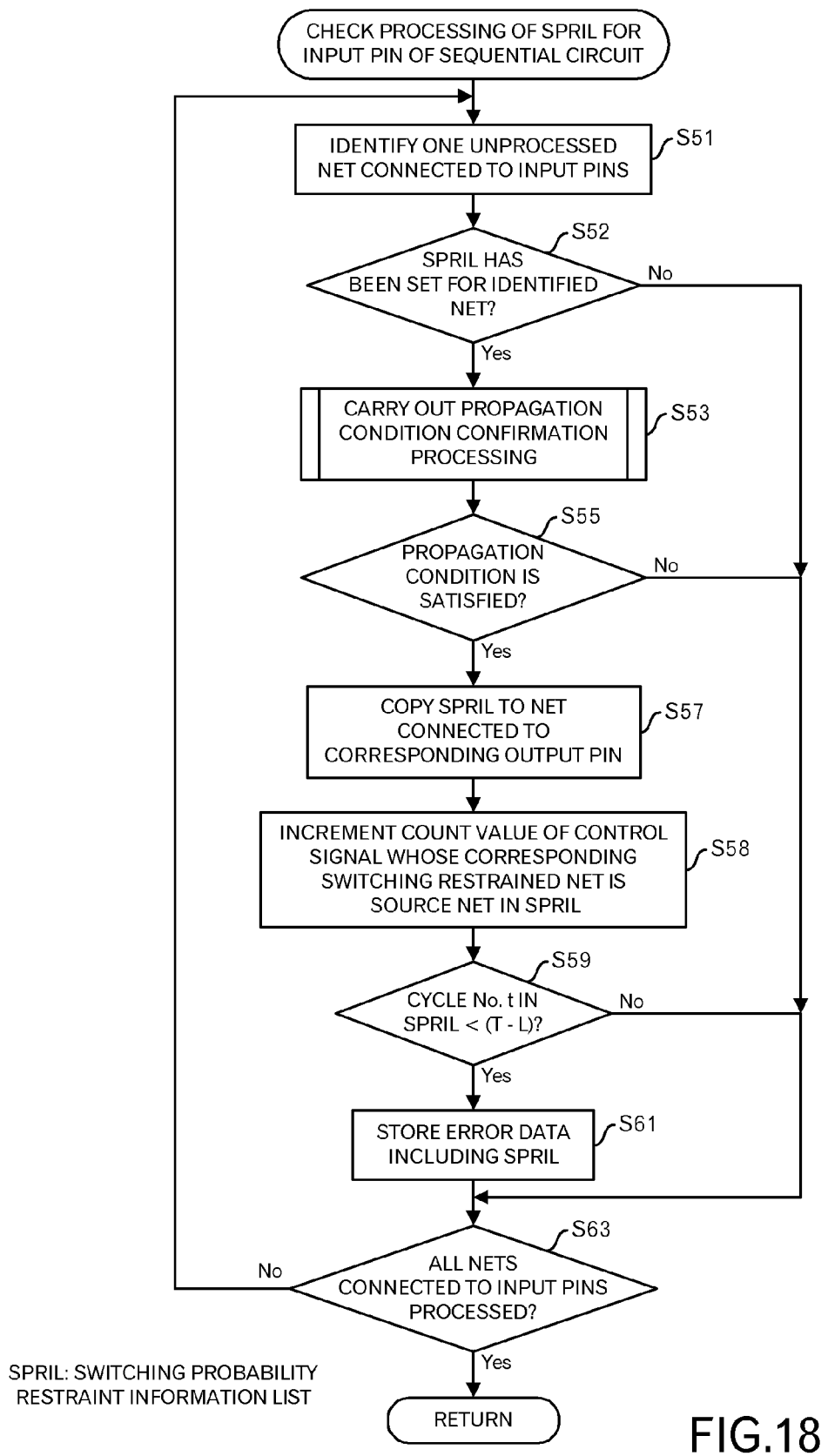
FIG. 18 is a diagram depicting a processing flow of a check processing of the switching probability restraint information list for an input pin of the sequential circuit.
Figure 19:
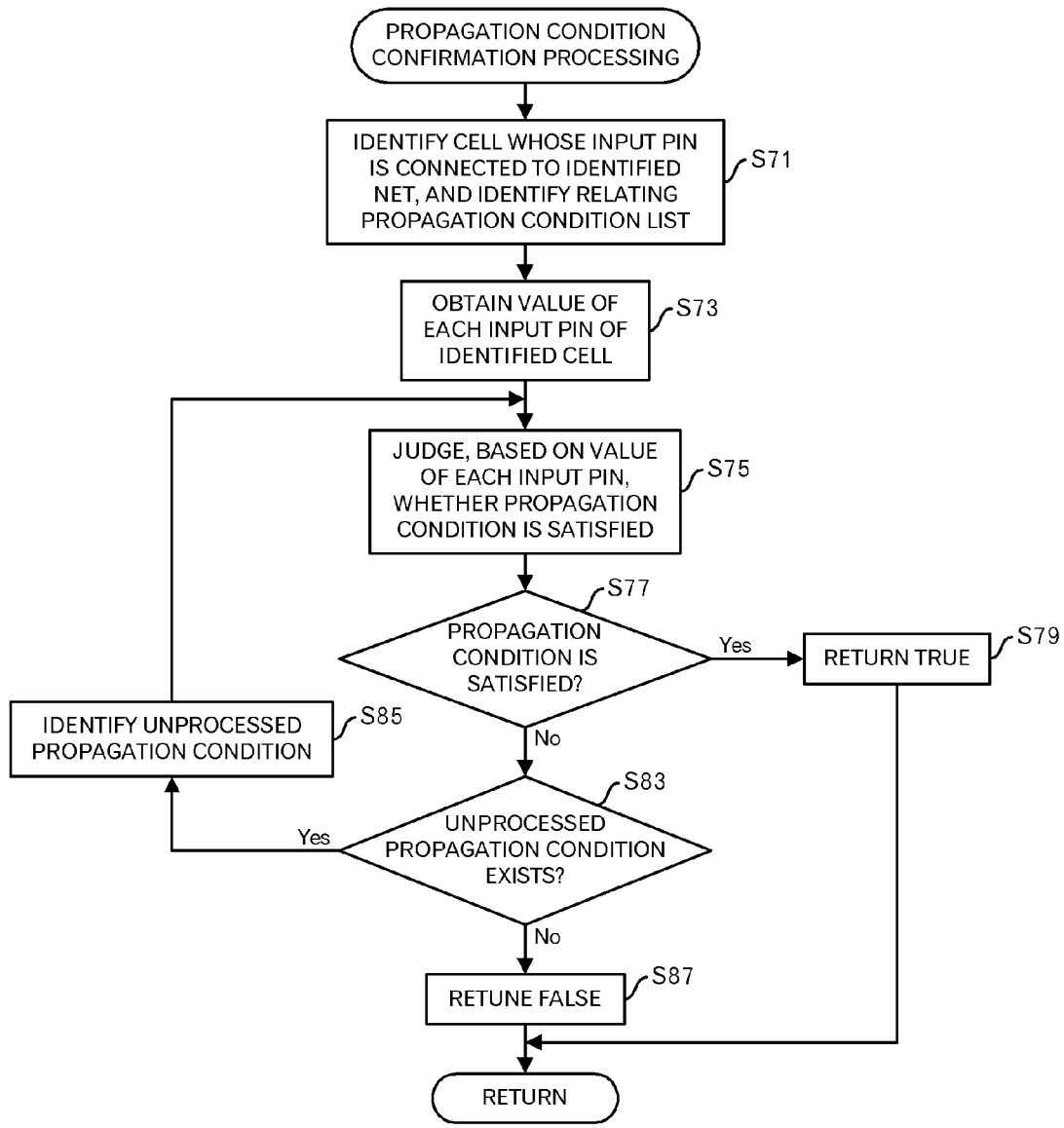
FIG. 19 is a diagram depicting a processing flow of a propagation condition confirmation processing.

Returning to the explanation of the processing of FIG. 18, the switching probability restraint information list manager 171 judges whether or not the result of the propagation condition confirmation processing is "True", namely, the propagation condition is satisfied (step S55). When the propagation condition is not satisfied, namely, the result of the propagation condition confirmation processing is "False", the processing shifts to the step S63.

On the other hand, when the propagation condition is not satisfied, the switching probability restraint information list manager 171 copies the switching probability restraint information list set for the identified net to the net connected to the output pin of the cell whose input pin is connected the identified net, in the switching probability restraint information list storage 173 (step S57).

Furthermore, the switching probability restraint information list manager 171 increments the count value of the control signal net whose corresponding switching restrained net is the source net included in the copied switching probability restraint information list by "1", and registers the incremented count value in the switching restraint count value storage 175 (step S58). Thus, for each control signal, the range influenced by the control signal is reflected to the count value.

Then, the switching probability restraint information list manager 171 judges whether or not the cycle number t of the copied switching probability restraint information list is less than difference between the present cycle number T and the maximum number L of cycles, which is stored in the threshold storage 11, namely, the switching probability restraint information list was generated prior to the maximum number L of cycles or more from the present (step S59). When the cycle number t of the copied switching probability restraint information list is greater than the difference between the present cycle number T and the maximum number L of cycles, the switching probability restraint information list is within a life tolerant range. Hence, the processing shifts to the step S63.

On the other hand, when the cycle number t of the copied switching probability restraint information list is less than the difference between the present cycle number T and the maximum number L of cycles, the switching probability restraint information list manager 171 stores error data including the switching probability restraint information list to the output data storage 19, because the switching probability restraint information list remains over the life tolerant range (step S61).

Then, the switching probability restraint information list manager 171 judges whether or not all nets connected to the input pin of either sequential circuit have been processed (step S63). When any unprocessed net exists, the processing returns to the step S51. On the other hand, when all nets have been processed, the processing returns to the original processing. That is, the processing returns to the processing of FIG. 13, and further the processing returns to the processing of FIG. 12.

By carrying out the aforementioned processing, the processing for the sequential processing is completed. Namely, the generation, propagation of the switching probability restraint information list and error judgment are carried out.

Figure 12:
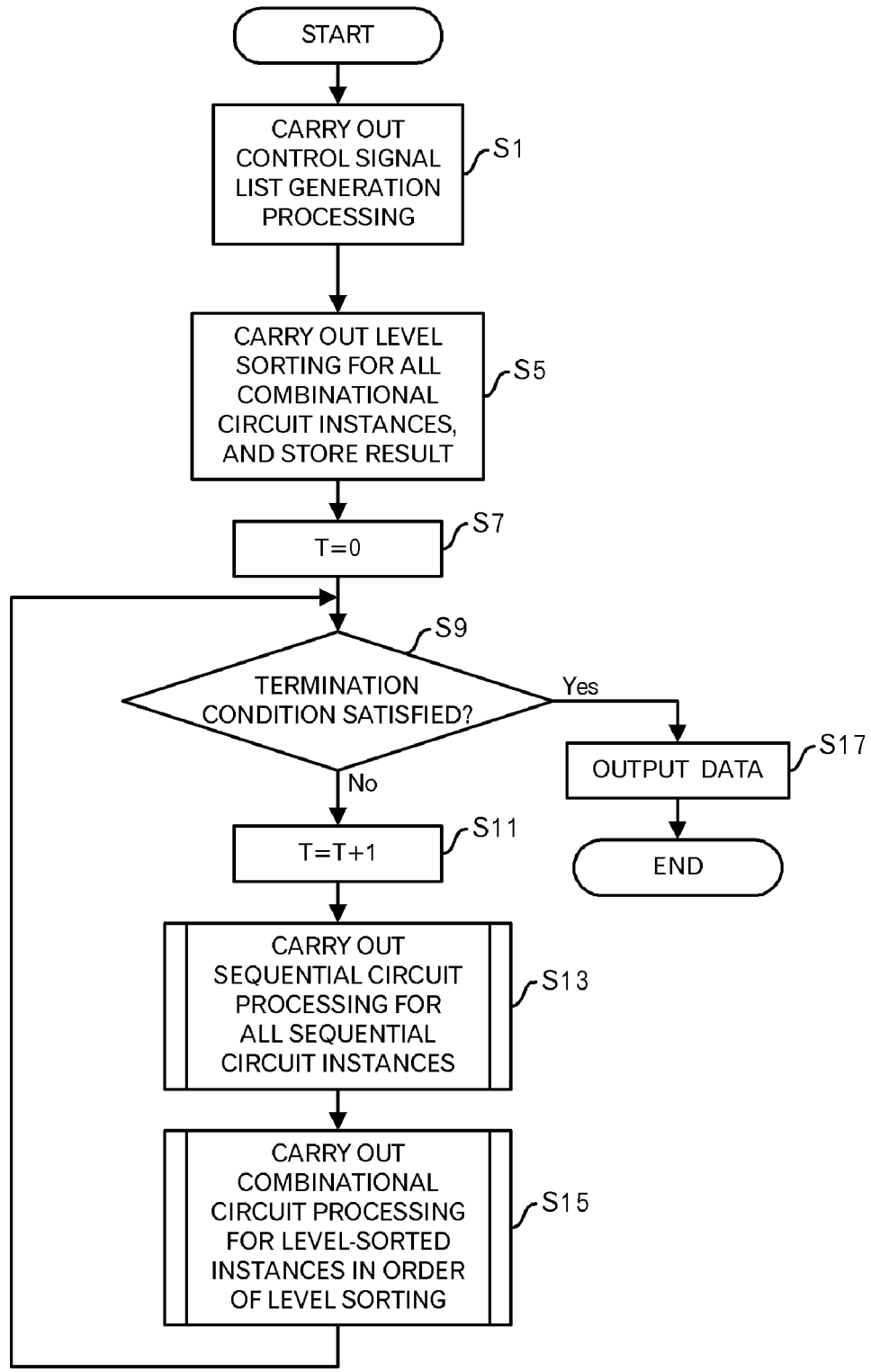
FIG. 12 is a diagram depicting a main processing flow in the embodiments.

Returning to the explanation of the processing of FIG. 12, next, the logic simulator 17 carries out a combinational circuit processing for the combinational circuit instances, for which the level sorting was carried out, in an order of the level sorting (step S15). The combinational circuit processing will be explained by using FIGS. 22 and 23.

First, the logic simulator 17 determines the output value of each combinational circuit by a well-known logic simulation in an order of the level sorting (step S91). Then, the logic simulator 17 carries out a switching probability restraint information list initialization processing for the combinational circuits (step S93). The processing contents of this switching probability restraint information list initialization processing are the same as those of the aforementioned switching probability restraint information list initialization processing (in FIG. 14) for the sequential circuits. Therefore, the detailed explanation of the processing is omitted, here.

Next, the logic simulator 17 carries out a check processing of the switching probability restraint information list for the input pin of the combinational circuit (step S95). This processing will be explained by using FIG. 23.

The switching probability restraint information list manager 171 identifies one unprocessed net connected to the input pin of the combinational circuit in an order of the level sorting (step S101).

Then, the switching probability restraint information list manager 171 refers to the switching probability restraint information list storage 173 to judge whether or not the switching probability restraint information list is set to the identified net (step S103). When the switching probability restraint information list is not set to the identified net, the processing shifts to step S113.

On the other hand, when the switching probability restraint information list is set to the identified net, the switching probability restraint information list manager 171 carries out a propagation condition confirmation processing (step S105). This propagation condition confirmation processing is the same as the propagation condition confirmation processing depicted in FIG. 19.

Next, the switching probability restraint information list manager 171 judges whether or not the result of the propagation condition confirmation processing is "True", namely, the propagation condition is satisfied (step S107). When the propagation is not satisfied, namely, the result of the propagation condition confirmation processing is "False", the processing shifts to the step S113.

On the other hand, when the propagation condition is satisfied, the switching probability restraint information list manager 171 copies the switching probability restraint information list set for the identified net to a net connected to the output pin of a cell whose input pin is connected to the identified net in the switching probability restraint information list storage 173 (step S109).

Furthermore, the switching probability restraint information list manager 171 increments the count value of the control signal whose corresponding switching restrained net in the switching restraint count value storage 175 is the source net included in the copied switching probability restraint information list by "1", and registers the incremented count value into the switching restraint count value storage 175 (step S111). Thus, for each control signal, the range influenced by the control signal is reflected to the count value.

Then, the switching probability restraint information list manager 171 judges whether or not all of the nets connected to the input pin of the combinational circuits have been processed (step S113). When any unprocessed net exists, the processing returns to the step S101. On the other hand, when all of the nets have been processed, the processing returns to the original processing. Namely, the processing returns to the processing of FIG. 22, and further returns to the processing of FIG. 12.

By carrying out the aforementioned processing, the processing for the combinational circuits is completed. Namely, the generation and propagation of the switching probability restraint information list are carried out.

Returning to the explanation of the processing in FIG. 12, when the step S15 is completed, the processing returns to the step S9. Then, the logic simulator 17 judges whether or not a termination condition is satisfied. Until the termination condition is satisfied, the steps S11 to S15 are repeated.

When the termination condition is satisfied, the logic simulator 17 stores data stored in the switching restraint count value storage 175 and data stored in the signal change count value storage 179 into the output data storage 19, and the output unit 21 outputs data stored in the output data storage 19 to a display device or the like (step S17).

Thus, the user can confirm the presence of errors, and if any error exists, the user confirms the switching probability restraint information list identified as a problem, and further confirms whether or not changes conducted in order to reduce the power consumption has any problem in the circuit. In addition, by referring to data stored in the switching restraint count value storage 175, it is possible to judge the effect of the switching restraint for each control signal. Furthermore, by referring to data stored in the signal change count value storage 179, it is possible to identify a net in which the signal transition frequently occurs regardless of being in the switching restraining mode. Accordingly, it is possible to carry out countermeasures such as confirming whether or not any problem occurs in the net.

In addition, it is unnecessary for the designer to create judgment references other than the maximum number L of cycles, and no step to compare the results of the logic simulations or the like is required. Namely, even when the designer changes circuits in order to reduce the power consumption, the work load necessary for the verification of the changes is reduced.

Incidentally, the switching probability restraint information list includes data of the cycle number of the cycle in which the switching probability restraint information list was generated. Although it is also described above, this cycle number is used to judge whether or not the switching probability restraint information list remains over the maximum number L of cycles. Thus, in the embodiments, the cycle number has an important role for the error judgment.

Incidentally, the data stored in the switching restraint count value storage 175 and the data stored in the signal change count value storage 179 are not always necessary, and the counting processing may be skipped.

[Specific Example]

Figure 24:
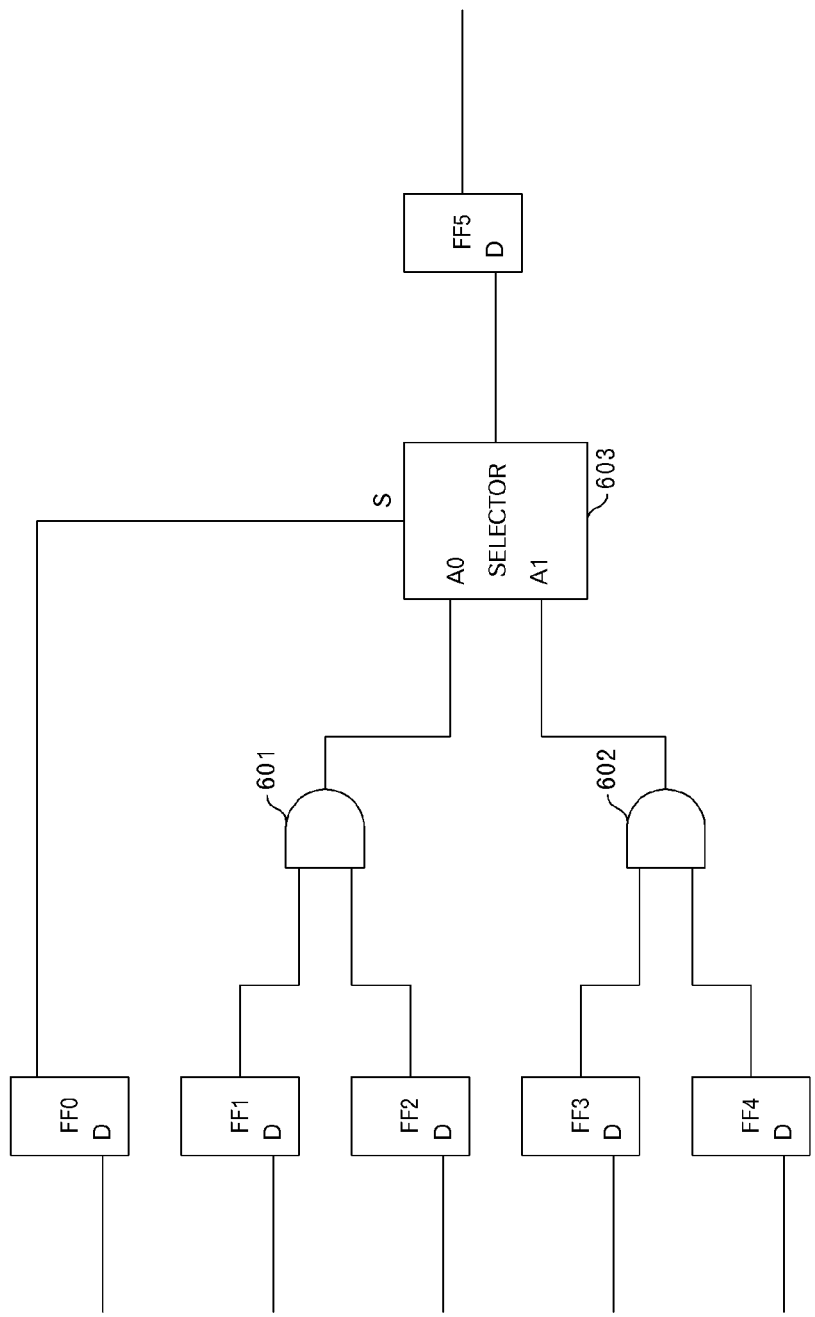
FIG. 24 is a diagram depicting a circuit example before changes for the reduction of the power consumption.

Specific examples of the aforementioned processing will be explained by using FIGS. 24 to 42. First, FIG. 24 depicts a circuit before making changes in order to reduce the power consumption. In the circuit example of FIG. 24, an output of FF1 and an output of FF2 are connected to inputs of an AND circuit 601, an output of FF3 and an output of FF4 are connected to inputs of an AND circuit 602, and an output of the AND circuit 601 and an output of the AND circuit 602 are connected to inputs of a selector 603. In addition, an output of FF0 is connected to the S terminal of the selector 603, and an output of the selector 603 is connected to the D terminal of FF5. Incidentally, although the same clock is input into all FFs in FIG. 24, the indication of the clock is omitted in the figure.

Figure 25:
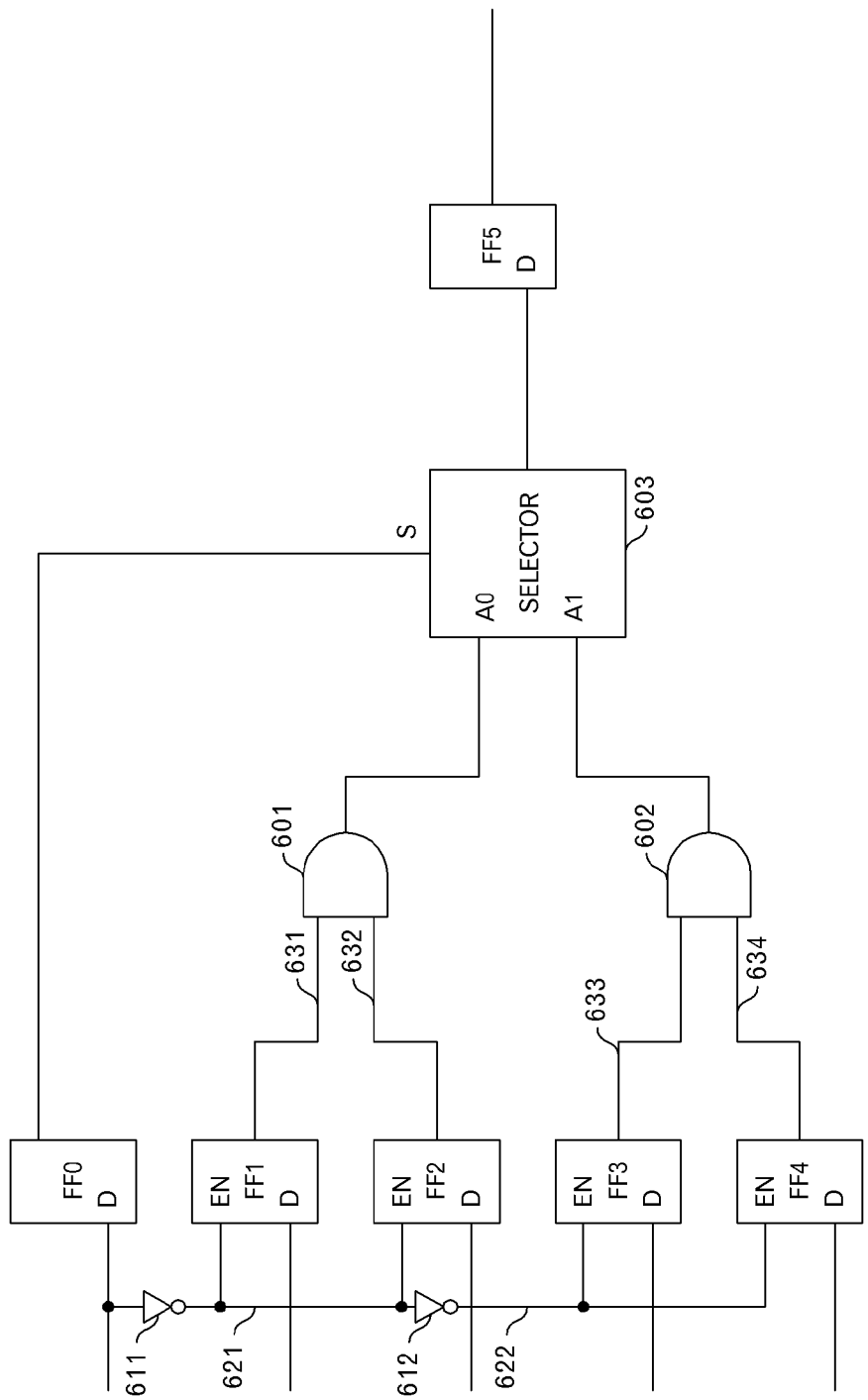
FIG. 25 is a diagram depicting a circuit example after correct changes for the reduction of the power consumption are conducted.

FIG. 25 depicts a circuit after changes for the reduction of the power consumption are made. Specifically, an input to the D terminal of FF0 is connected to a NOT circuit 611, and an output of the NOT circuit 611 is connected to EN terminals of FF1 and FF2. Furthermore, the output of the NOT circuit 611 is connected to an input of a NOT circuit 612, and an output of the NOT circuit 612 is connected to EN terminals of FF3 and FF4. Namely, when the input to the D terminal of FF0 is "1", the output of the AND circuit 602 is selected at the selector 603, and when the input to the D terminal of FF0 is "0", the output of AND circuit 601 is selected at the selector 603. Therefore, when the input to the D terminal of FF0 is "1" and the output of the NOT circuit 611 is "0", the operations of FF1 and FF2 are prohibited, and when the input to the D terminal of FF0 is "0" and the output of the NOT circuit 612 is "0", the operations of FF3 and FF4 are prohibited.

Figures 22, 26:
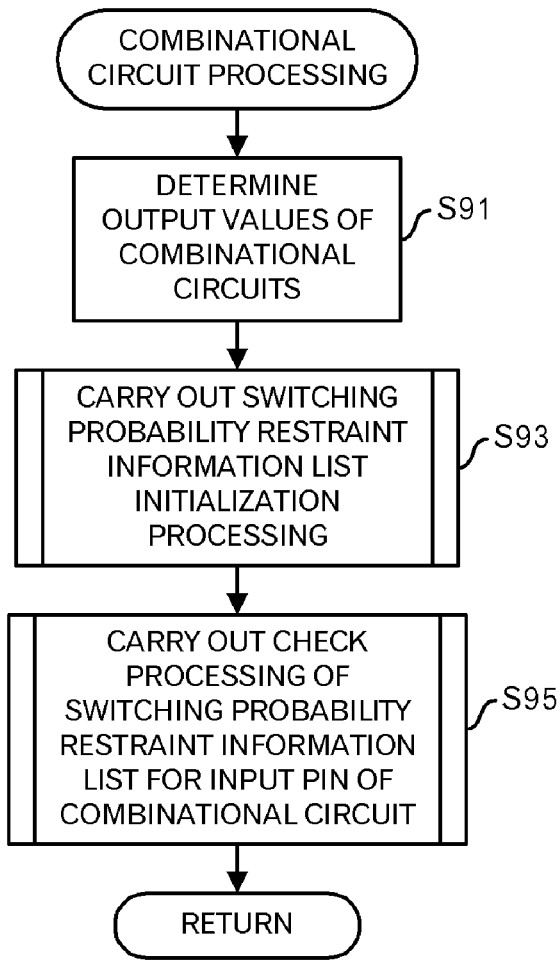
FIG. 22 is a diagram depicting a processing flow of a combinational circuit processing.
FIG. 26 is a diagram depicting an example of the control signal list in a case where the correct changes for the reduction of the power consumption are conducted.
Figure 23:
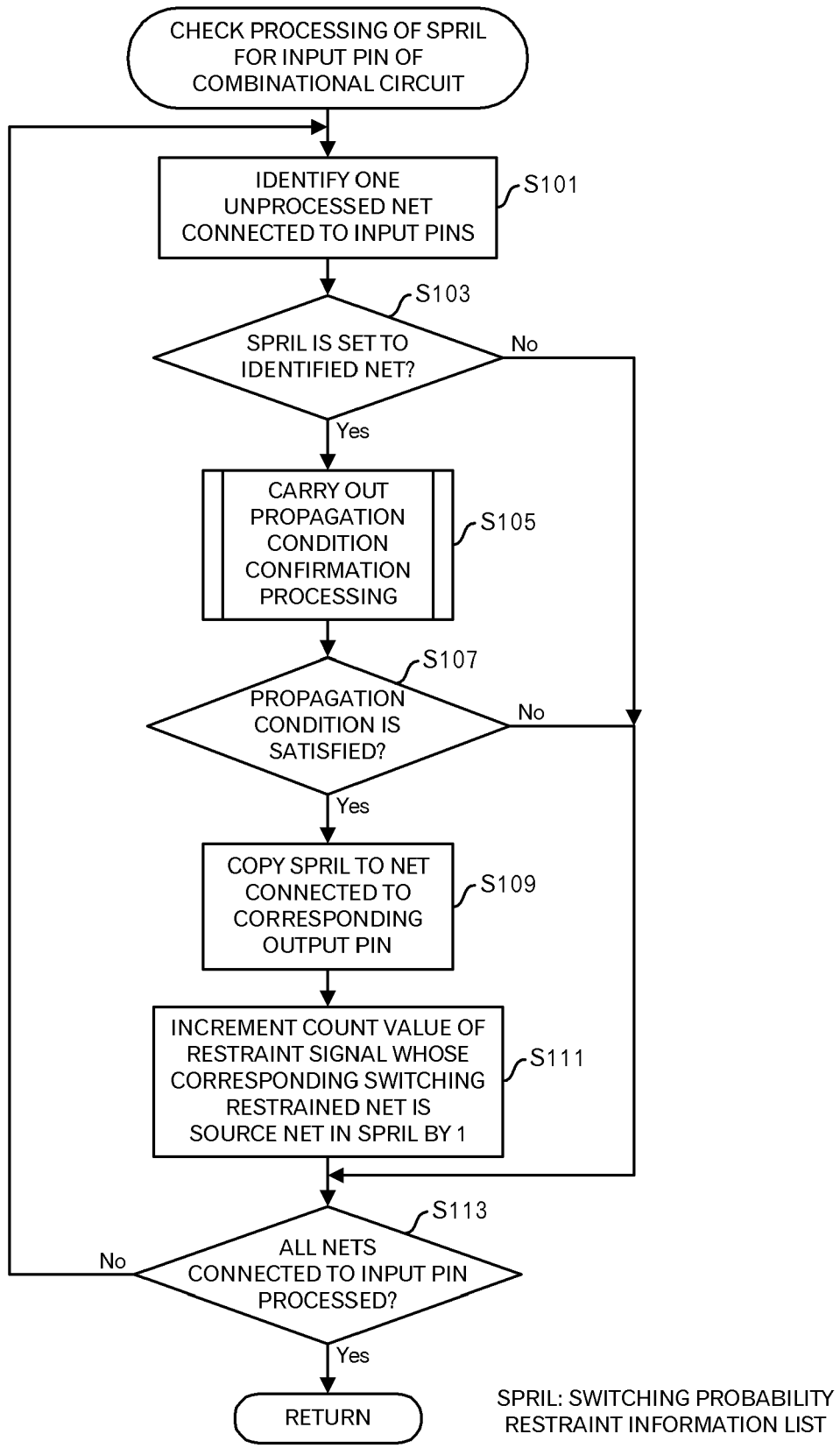
FIG. 23 is a diagram depicting a processing flow of a check processing of the switching probability restraint information list for an input pin of the combinational circuit.

Data stored in the control signal list storage 9 for the circuit as depicted in FIG. 25 is data as depicted in FIG. 26. Namely, the switching restrained nets are an output 631 (FF1_out) of FF1, an output 632 (FF2_out) of FF2, an output 633 (FF3_out) of FF3 and an output 634 (FF4_out) of FF4. The control signal of the switching restrained nets FF1_out and FF2_out is an output 621 of the NOT circuit 611. The control signal of the switching restrained nets FF3_out and FF4_out is an output 622 of the NOT circuit 612. Incidentally, the signal value of those control signals is "0".

Figure 27:
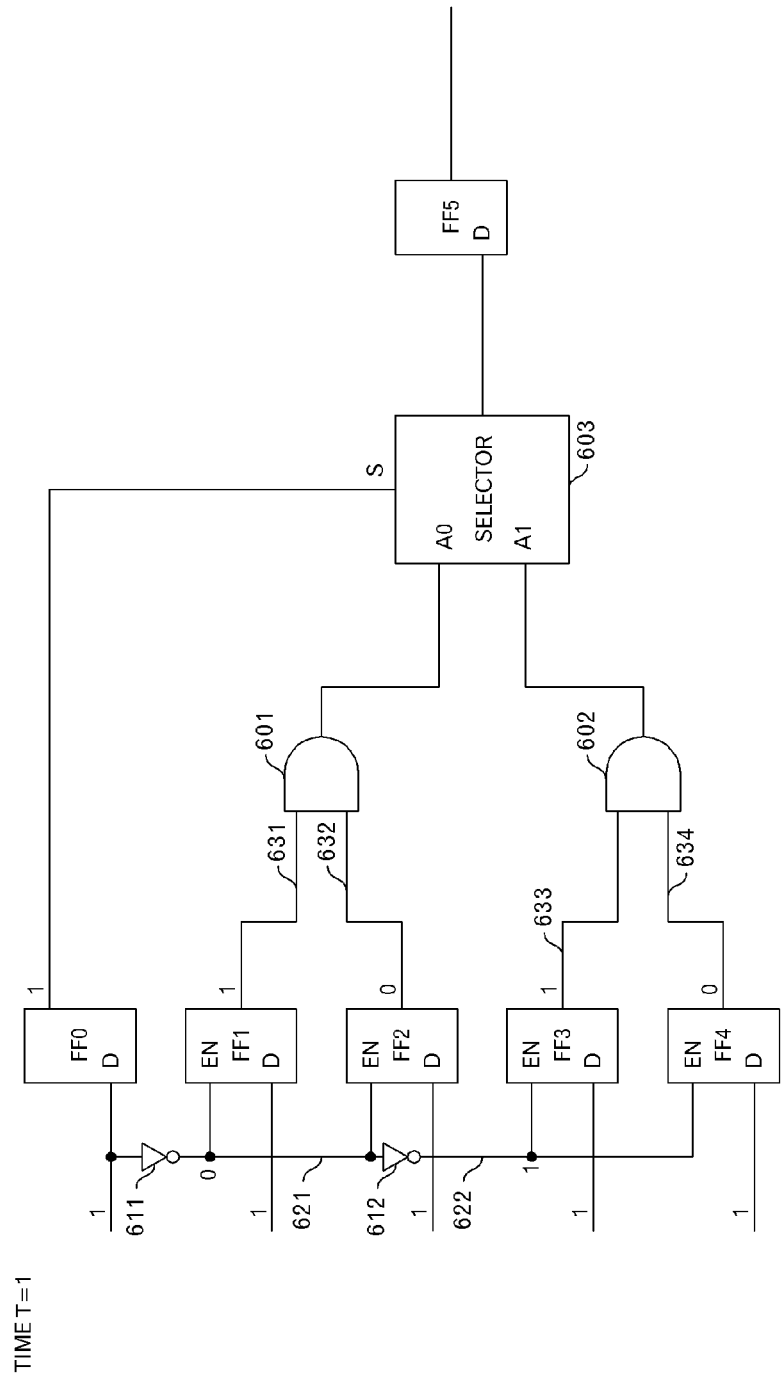
FIG. 27 is a diagram depicting a state at T=1 in the case where the correct changes for the reduction of the power consumption are conducted.

Next, FIG. 27 depicts a state immediately before time T=2. In the processing in each cycle, the value of the cycle number T is incremented by 1, and output values of sequential circuits and output values of combinational circuits are determined in sequence. After the output values of all circuits are determined, the processing in the next cycle is started. Basically, the output values of FF0 to FF5, the output values of AND circuits 601 and 602 and the output value of the selector 603 are determined in sequence. FIG. 27 depicts a state immediately before the cycle number T=2 and that the output values of FF0 to FF4 have been determined.

Figure 28:
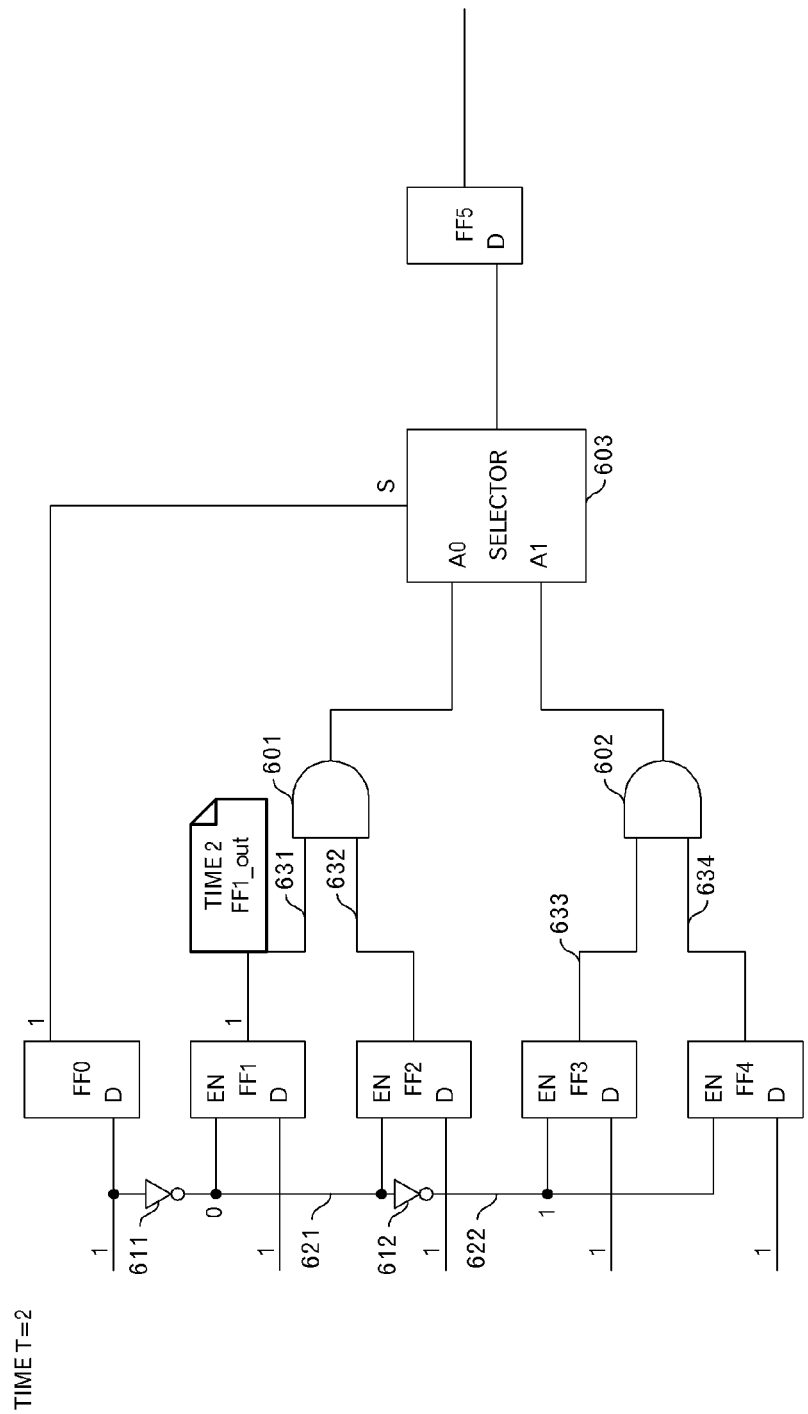
FIG. 28 is a diagram depicting a state at T=2 in the case where the correct changes for the reduction of the power consumption are conducted.

Next, FIG. 28 depicts a first state after time T=2. First, because the input to the EN terminal of FF1 is "0", the value immediately before is held and "1" is outputted. However, the output 631 of FF1 is the switching restrained net, and because the output value of the NOT circuit 611, which is the control signal net corresponding to this switching restrained net, is a designated value "0" in the control signal list (FIG. 26), the switching probability restraint information list including "time 2" and "FF1_out" is generated and set to the output 631 "FF1_out" of FF1.

Figure 29:
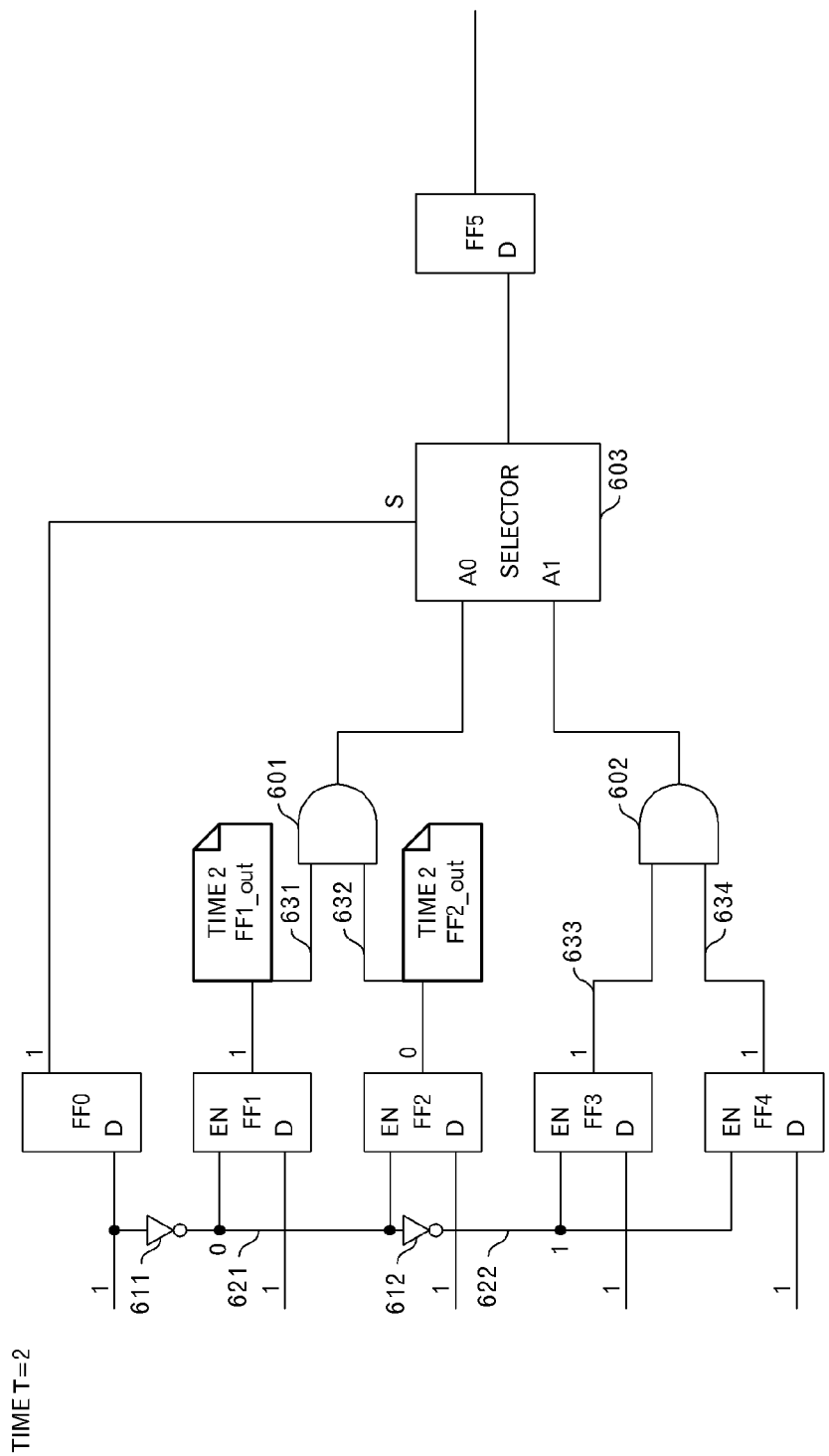
FIG. 29 is a diagram depicting a state at T=2 in the case where the correct changes for the reduction of the power consumption are conducted.

In addition, FIG. 29 depicts a state after FIG. 28. Because the input value to the EN terminal of FF2 in addition to FF1 is "0", the value immediately before is held and "0" is outputted. However, because the output 632 of FF2 is the switching restraint net and the output of the NOT circuit 511, which is the control signal net corresponding to this switching restraint net is a designated value "0" in the control signal list (FIG. 26), the switching probability restraint information list including "time 2" and "FF2_out" is generated and set to the output 632 "FF2_out" of FF2.

Incidentally, because "1" is inputted to the EN terminals of FF3 and FF4, the switching restraining mode is not enabled according to the control signal list (FIG. 26). Therefore, the input value "1" of the D terminals of FF3 and FF4 is outputted as "FF3_out" and "FF4_out" as they are.

Figure 30:
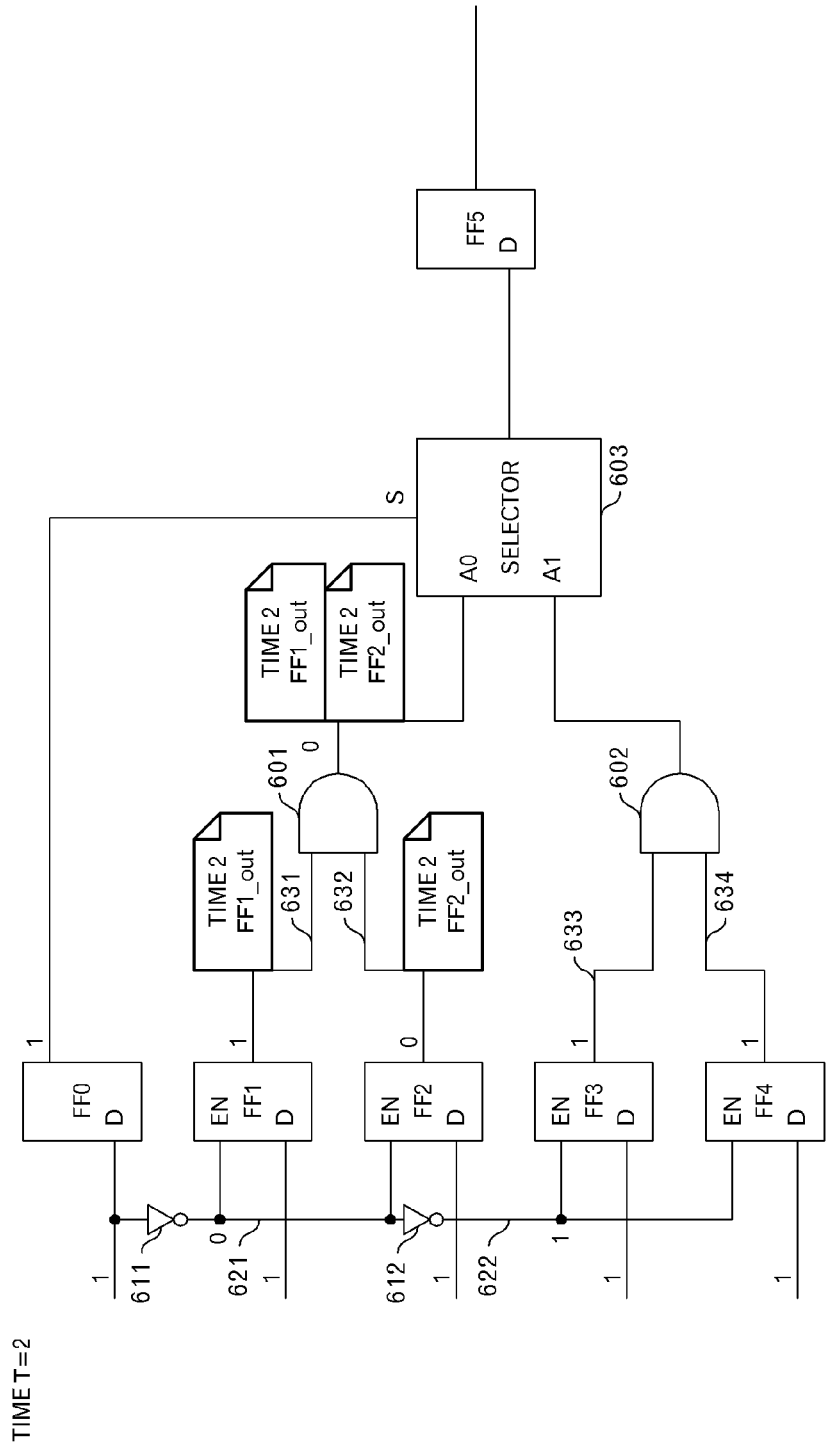
FIG. 30 is a diagram depicting a state at T=2 in the case where the correct changes for the reduction of the power consumption are conducted.

After that, the output value "0" of the AND circuit 601, which is a combinational circuit, is determined. At this time, as depicted in FIG. 30, because the switching probability restraint information list is set to two inputs of the AND circuit 601, two switching probability restraint information list are propagated to the output of the AND circuit 601.

Figure 31:
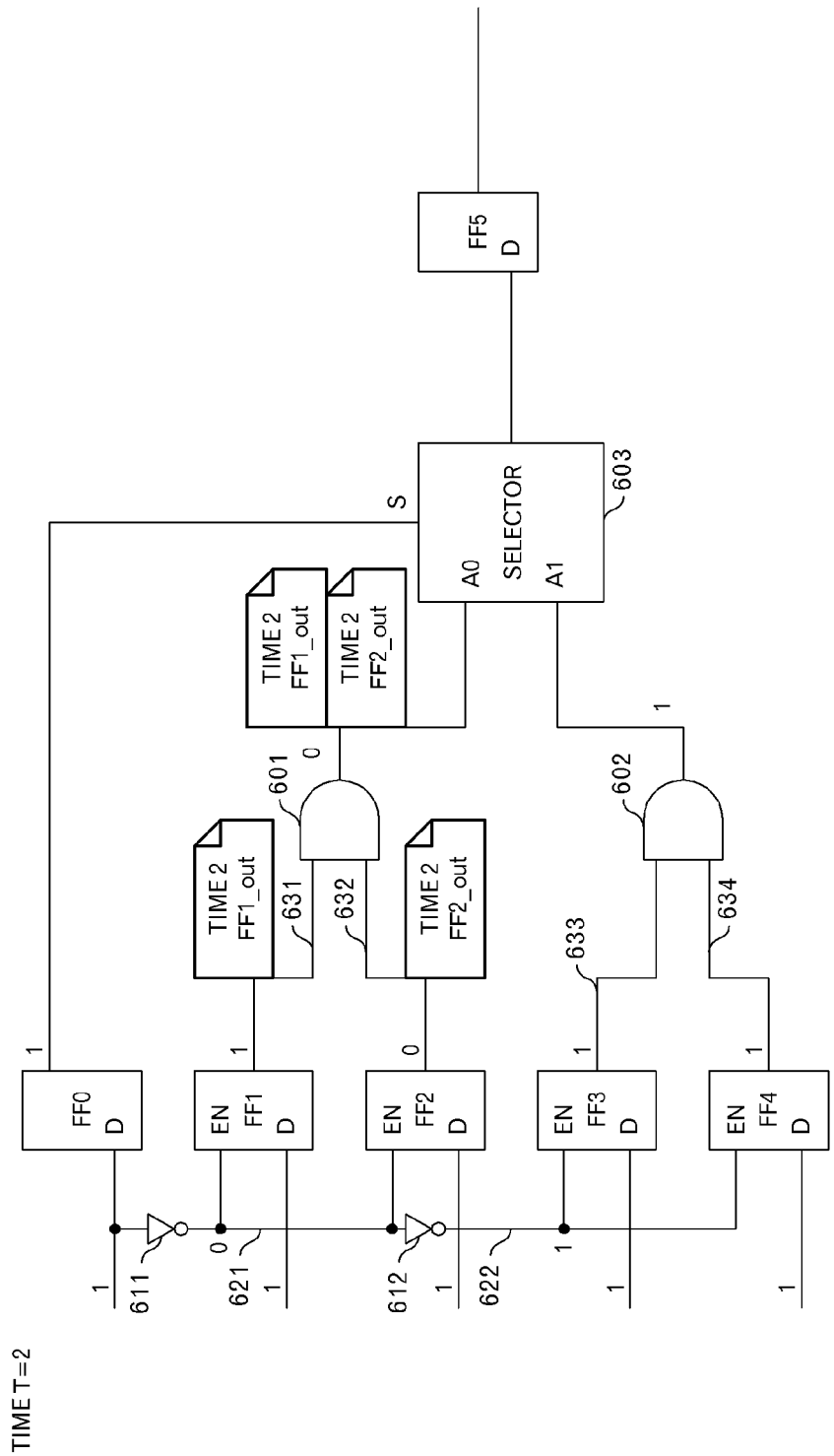
FIG. 31 is a diagram depicting a state at T=2 in the case where the correct changes for the reduction of the power consumption are conducted.

In addition, as depicted in FIG. 31, the output value "1" of the AND circuit 602, which is a combinational circuit, is also determined. Incidentally, because the input value of the S terminal of the selector 603 is "1", the output of the AND circuit 602, namely, the input of the A1 terminal of the selector 603 is selected. Therefore, because the output of the AND circuit 601 is not selected, two switching probability restraint information list set to the output of the AND circuit 601 is not propagated to the output of the selector 603.

Figure 32:
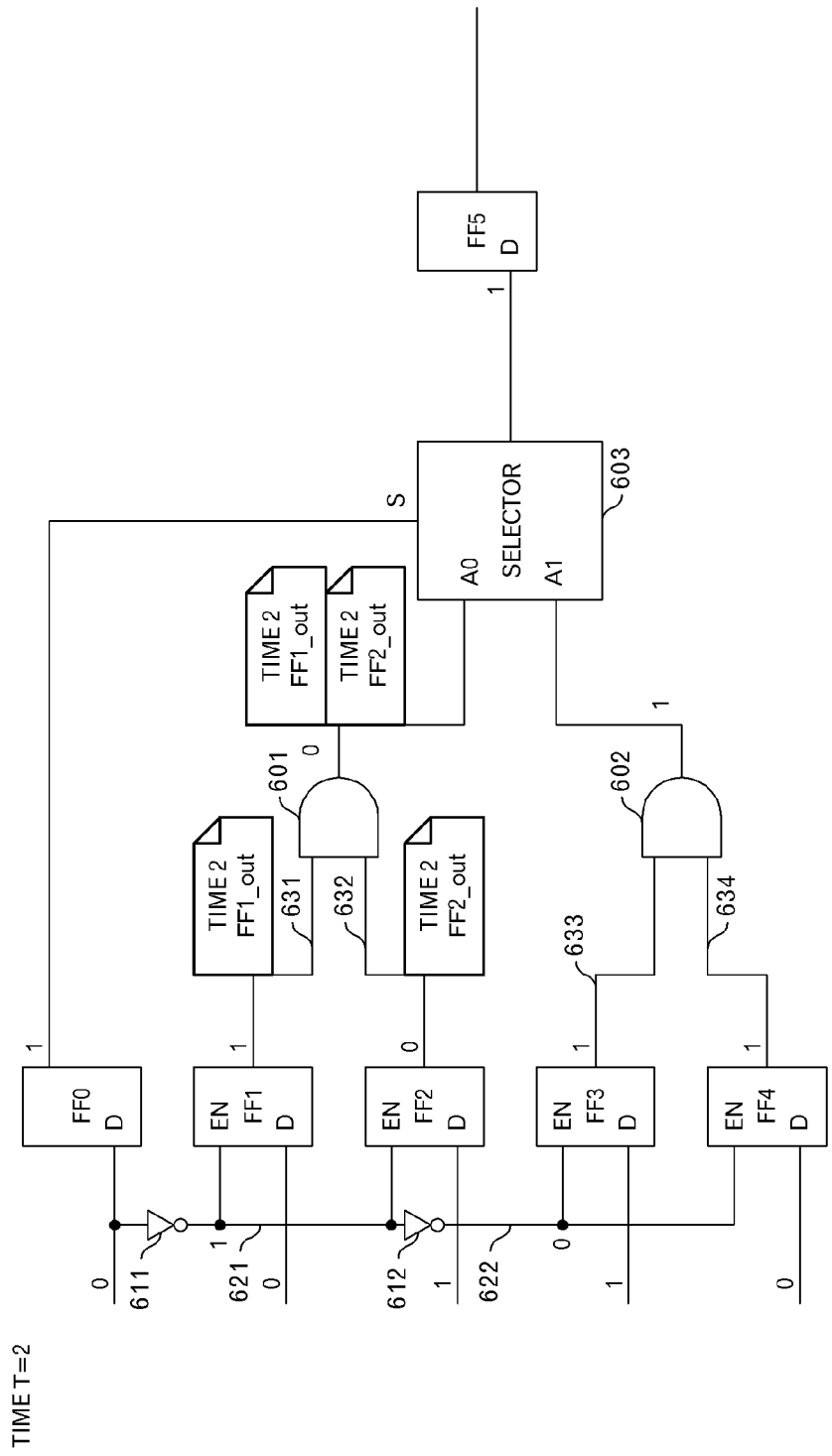
FIG. 32 is a diagram depicting a state at T=2 in the case where the correct changes for the reduction of the power consumption are conducted.

Therefore, as depicted in FIG. 32, the output value of the selector 603 is "1" and is inputted to the D terminal of FF5. In addition, the input value of the D terminal of FF0 is changed to "0", the input value of the D terminal of FF1 is changed to "0" and the input value of the D terminal of FF4 is changed to "0". This is a state immediately before T=3.

Figure 33:
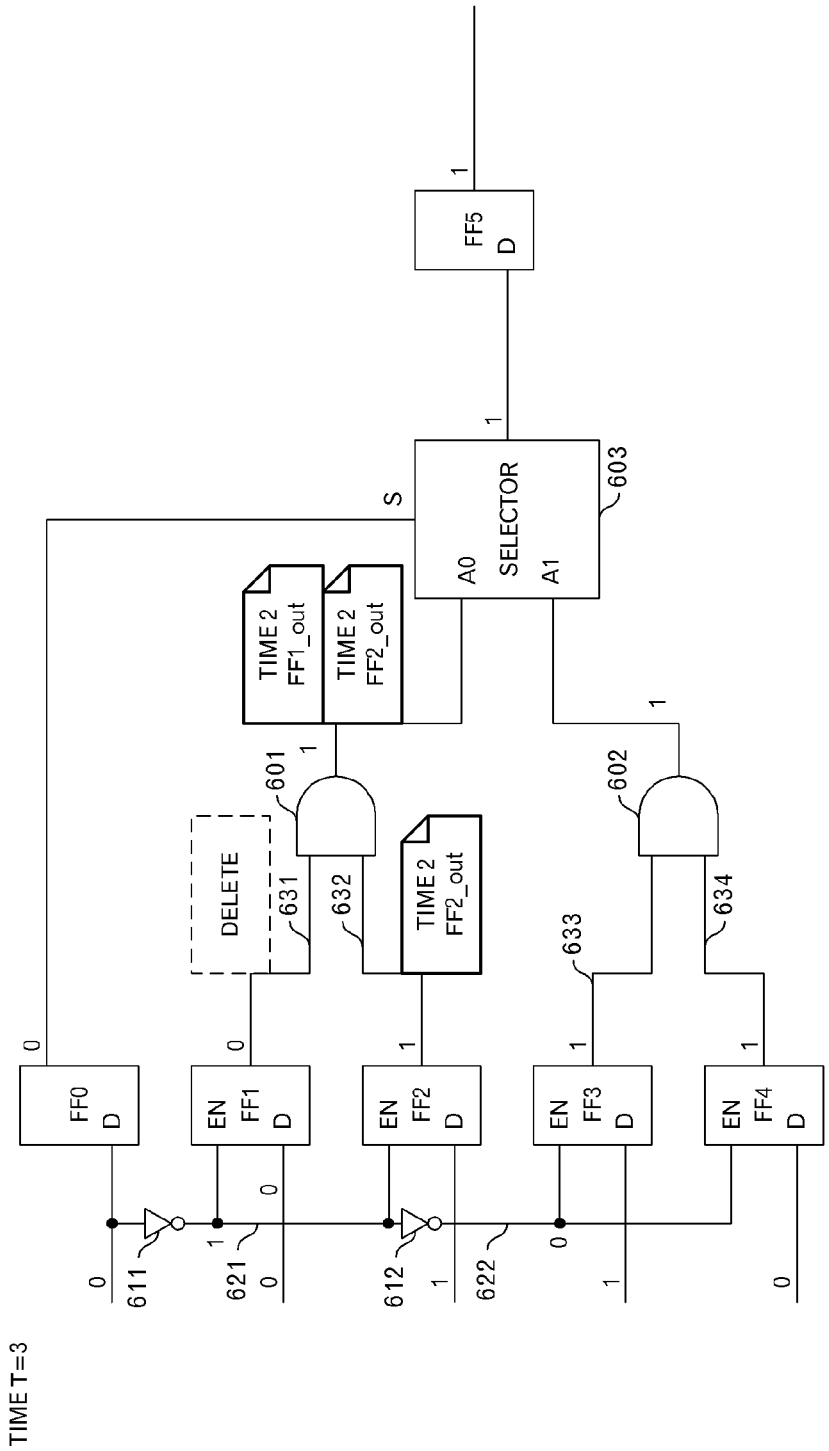
FIG. 33 is a diagram depicting a state at T=3 in the case where the correct changes for the reduction of the power consumption are conducted.

Next, FIG. 33 depicts a state after T=3. In T=2, FF1 and FF2 were in the switching restraining mode, but in T=3, FF3 and FF4 are in the switching restraining mode. Therefore, the input value "0" of the D terminal of FF1 becomes the value "0" of the output 631 of FF1. At this time, the switching probability restraint information list set for the output 631 of FF1 is deleted. Incidentally, at this stage, "1" is outputted from FF5. In addition, at a stage that the output of FF1 is processed, the switching probability restraint information list set for the output 632 of FF2 remains.

Figure 34:
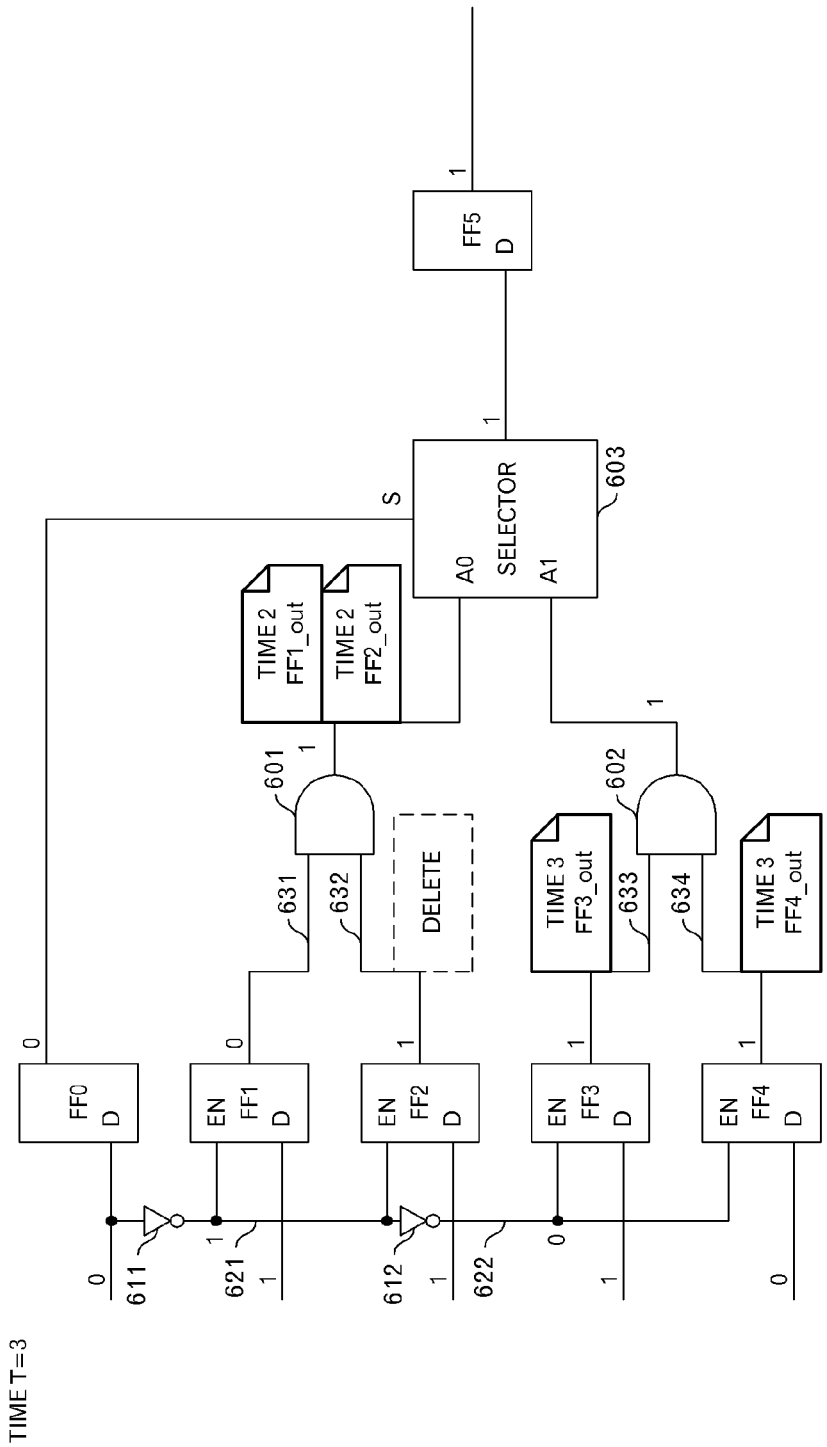
FIG. 34 is a diagram depicting a state at T=3 in the case where the correct changes for the reduction of the power consumption are conducted.

Furthermore, the value of the output 632 of FF2 is "1", but the switching restraining mode is not enabled. Therefore, as depicted in FIG. 34, the switching probability restraint information list set for the output 532 of FF2 is deleted. In addition, because the input to the EN terminal of FF3 is "0", the value immediately before is held and "1" is outputted. However, because the output 633 of FF3 is the switching restrained net, and the output of the NOT circuit 612, which is the control signal net corresponding to this switching restrained net, is a designated value "0" in the control signal list (FIG. 26), the switching probability restraint information list including "time 3" and "FF3_out" is generated and set to the output 633 "FF3_out" of FF3.

Similarly, because the input to the EN terminal of FF4 is "0", the value immediately before is held and "1" is outputted. However, because the output 634 of FF4 is the switching restrained net, and the output of the NOT circuit 612, which is the control signal net corresponding to this switching restrained net, is a designated value "0" in the control signal list (FIG. 26), the switching probability restraint information list including "time 3" and "FF4_out" is generated and set to the output 634 "FF4_out" of FF4.

Figure 35:
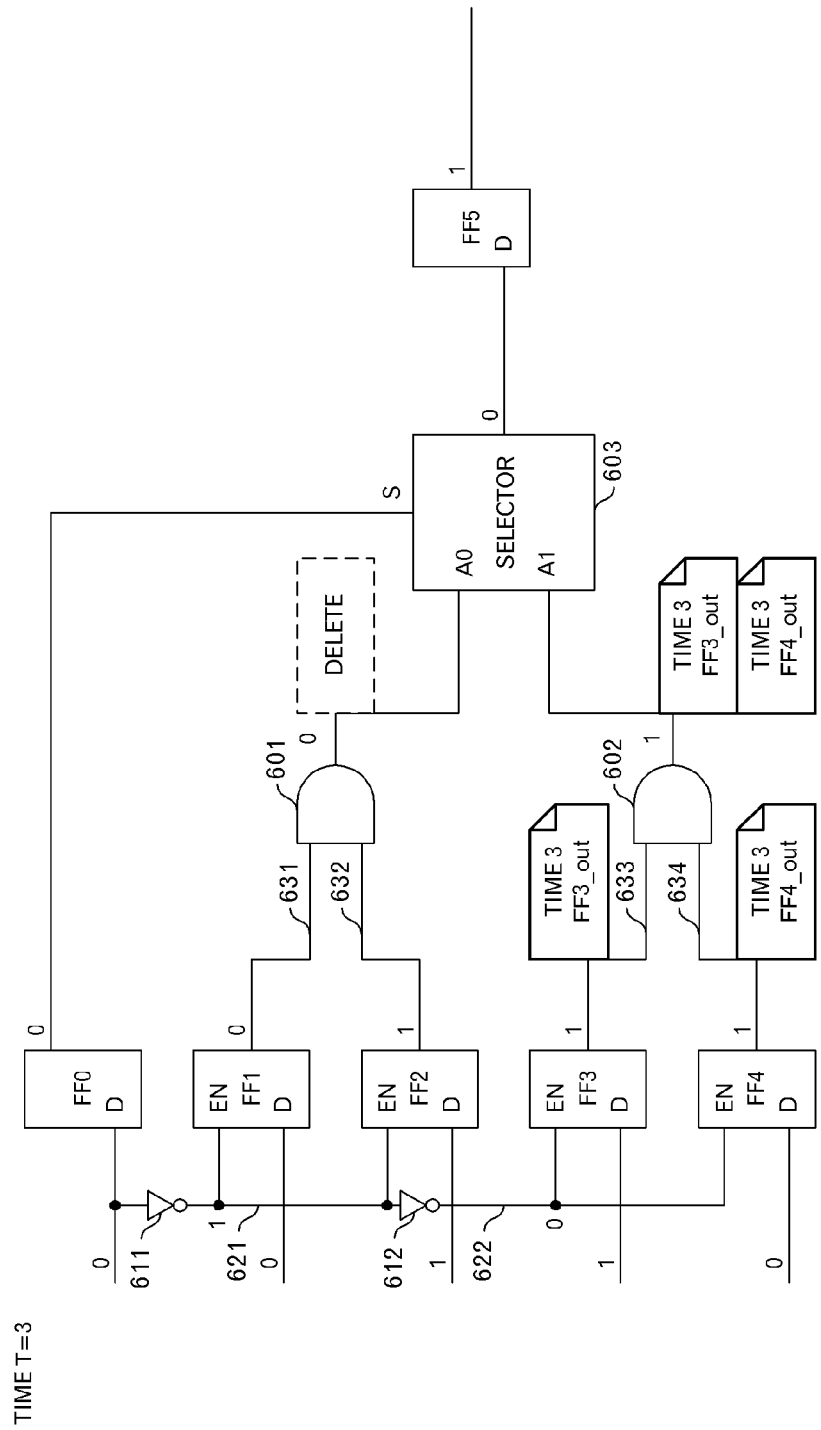
FIG. 35 is a diagram depicting a state at T=3 in the case where the correct changes for the reduction of the power consumption are conducted.

Next, when shifting to the processing for the combinational circuit as depicted in FIG. 35, the switching probability restraint information list set for the output of the AND circuit 601 is deleted. In addition, the output value of the AND circuit 601 is determined as "0". On the other hand, because the output value of the AND circuit 602 is determined as "1" and two switching probability restraint information lists are respectively set to two inputs of the AND circuit 602, two switching probability restraint information lists are also propagated to the output of the AND circuit 602. Incidentally, because the input value of the S terminal of the selector 603 is "0", the output value "0" of the AND circuit 601 becomes the output value of the selector 603. Namely, two switching probability restraint information lists are not propagated to the output of the selector 603. This is a state immediately before T=4.

By carrying out such processing, it is possible to confirm that the switching probability restraint information list is not propagated over the selector 603.

Figure 36:
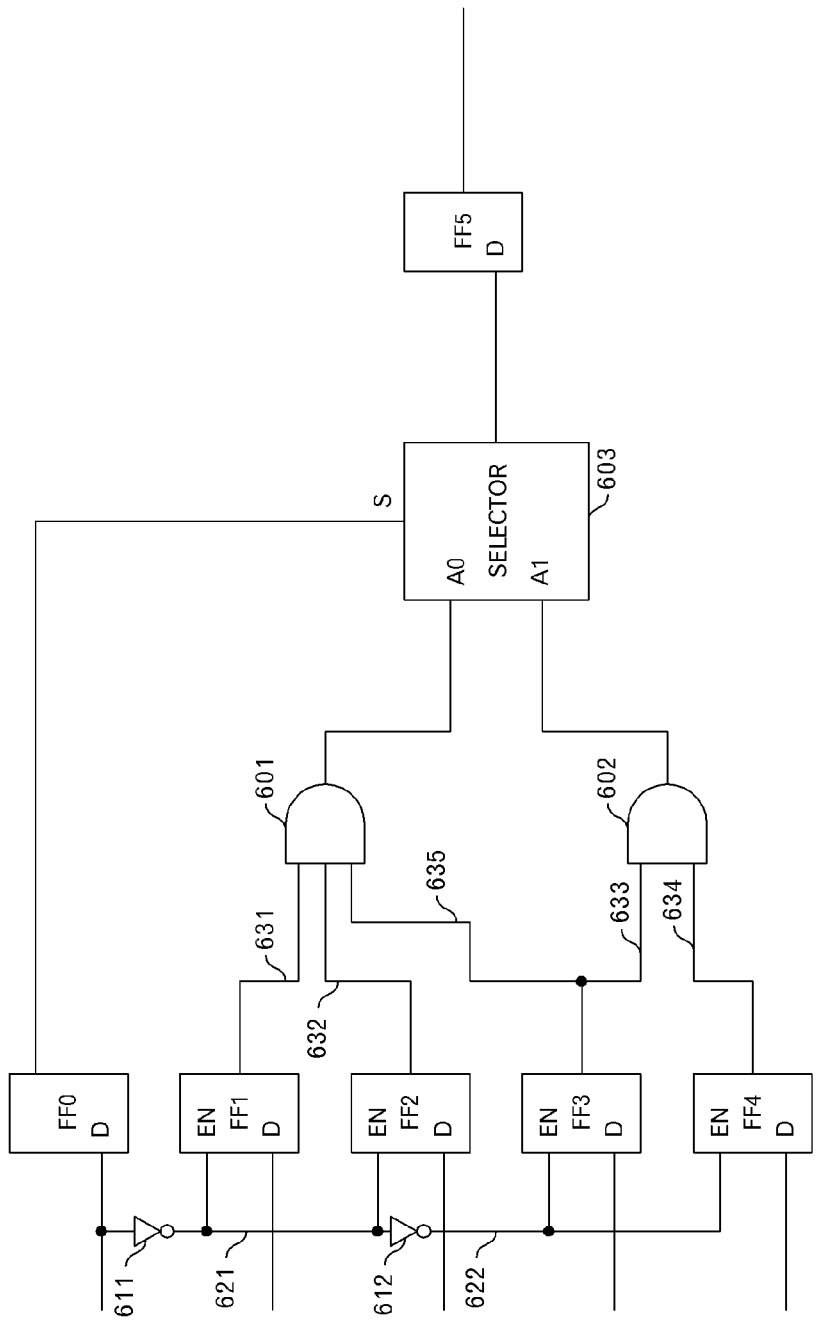
FIG. 36 is a diagram depicting a circuit example in a case where incorrect circuit changes are conducted.

On the other hand, an example that the circuit as depicted in FIG. 24 is incorrectly changed is depicted in FIG. 36. FIG. 36 depicts an example that, in addition to the changes as depicted in FIG. 25, the output 635 of FF3 is erroneously connected to the input of the AND circuit 601 and the AND circuit 601 is changed to 3-input AND circuit. Incidentally, data stored in the control signal list storage 9 is the same as that depicted in FIG. 26.

Figure 37:
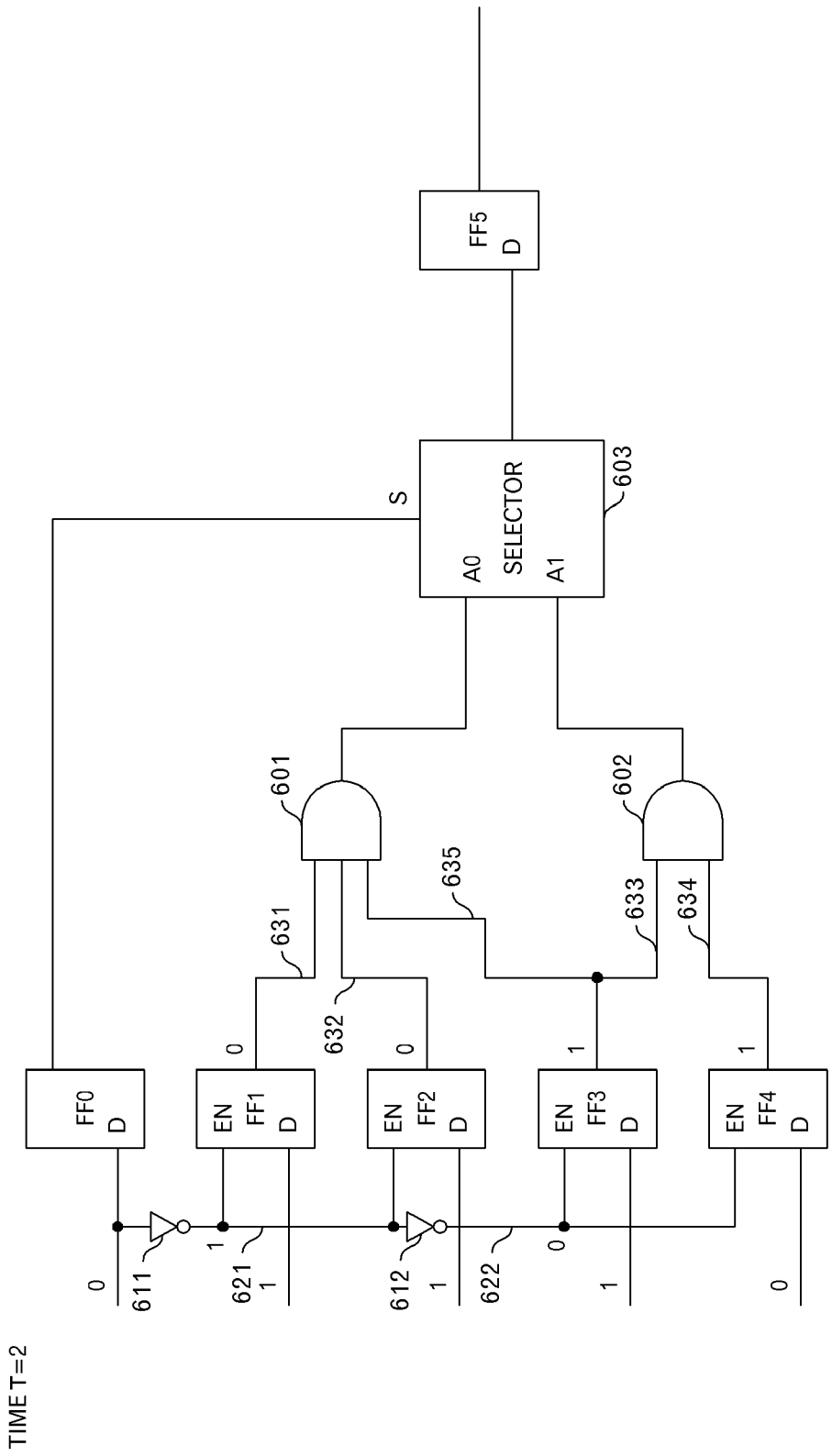
FIG. 37 is a diagram depicting a state at T=2 in the case where the incorrect circuit changes are conducted.

FIG. 37 depicts a state immediately before T=3. The output values of FF1 and FF2 are "0", the output values of FF3 and FF4 are "1", the input values of the D terminal of FF0 is "0", the input value to the D terminals of FF1 to FF3 are "1", and the input value to the D terminal of FF4 is "0". Incidentally, at T=3, because "0" is inputted to the EN terminals of FF3 and FF4, the switching restraining mode is enabled. Because "1" is inputted to the EN terminals of FF1 and FF2, FF1 and FF2 are in the normal mode.

Figure 38:
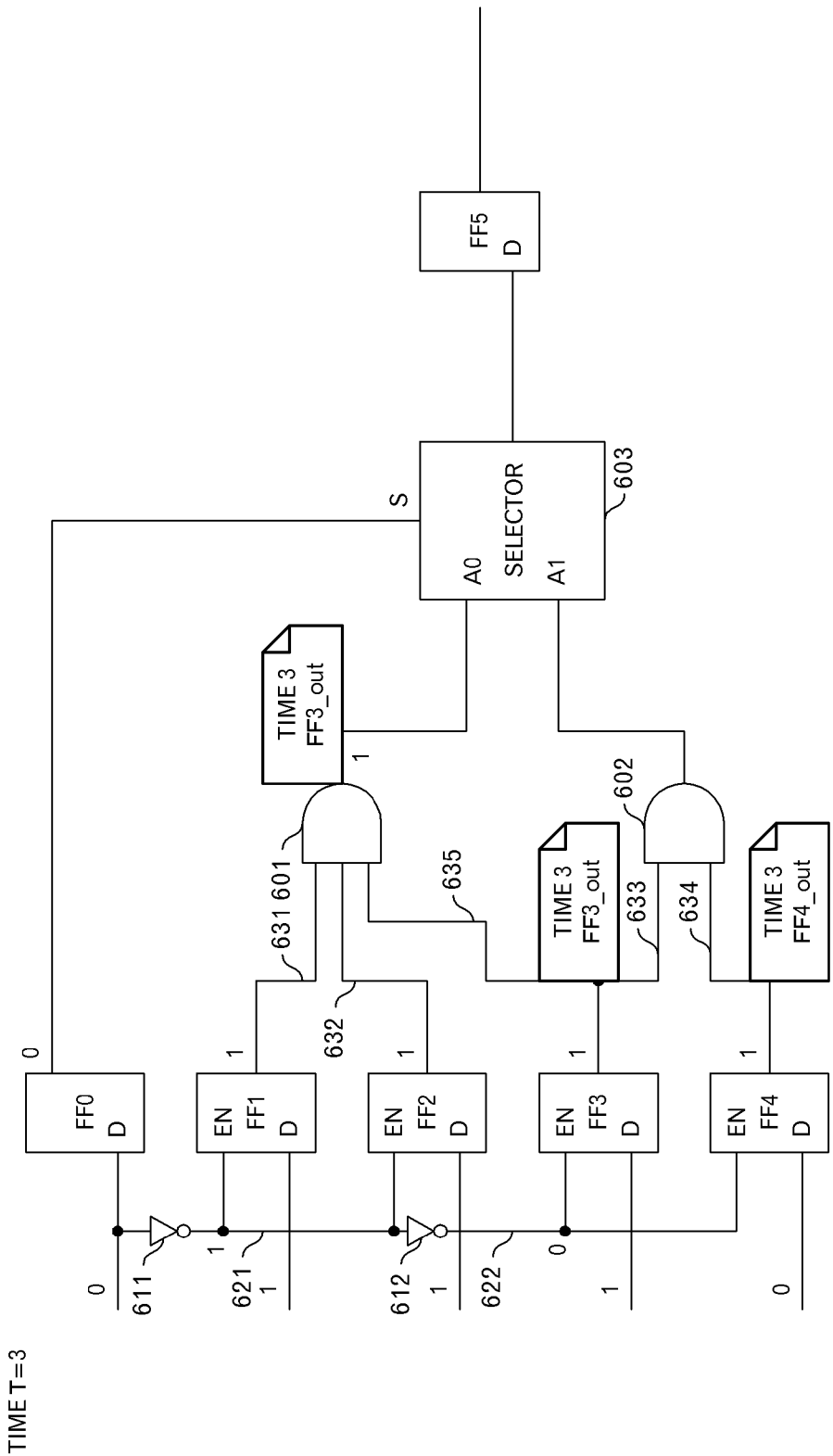
FIG. 38 is a diagram depicting a state at T=3 in the case where the incorrect circuit changes are conducted.

FIG. 38 depicts a state at T=3. The switching probability restraint information list including "time 3" and "FF3_out" is set to the outputs 633 and 635 of FF3 in the switching restraining mode. Similarly, the switching probability restraint information list including "time 3" and "FF4_out" is also set to the output 634 of FF4. Furthermore, because the input to the D terminals of FF1 and FF2 in the normal mode is "1", the output values of the FF1 and FF2 are also "1".

When shifting to the processing for the combinational circuit after that, because the values of the output 631 of FF1 and the output 632 of FF2 are also "1", the output value of the AND circuit 601 is also "1". At this time, because the values of the output 631 of FF1 and the output 632 of FF2 are "1", the propagation condition of the 3-input AND circuit is satisfied, and the switching probability restraint information list set for FF3_out, which is connected to the input of the AND circuit 601, is propagated to the output of the AND circuit 601.

Figure 39:
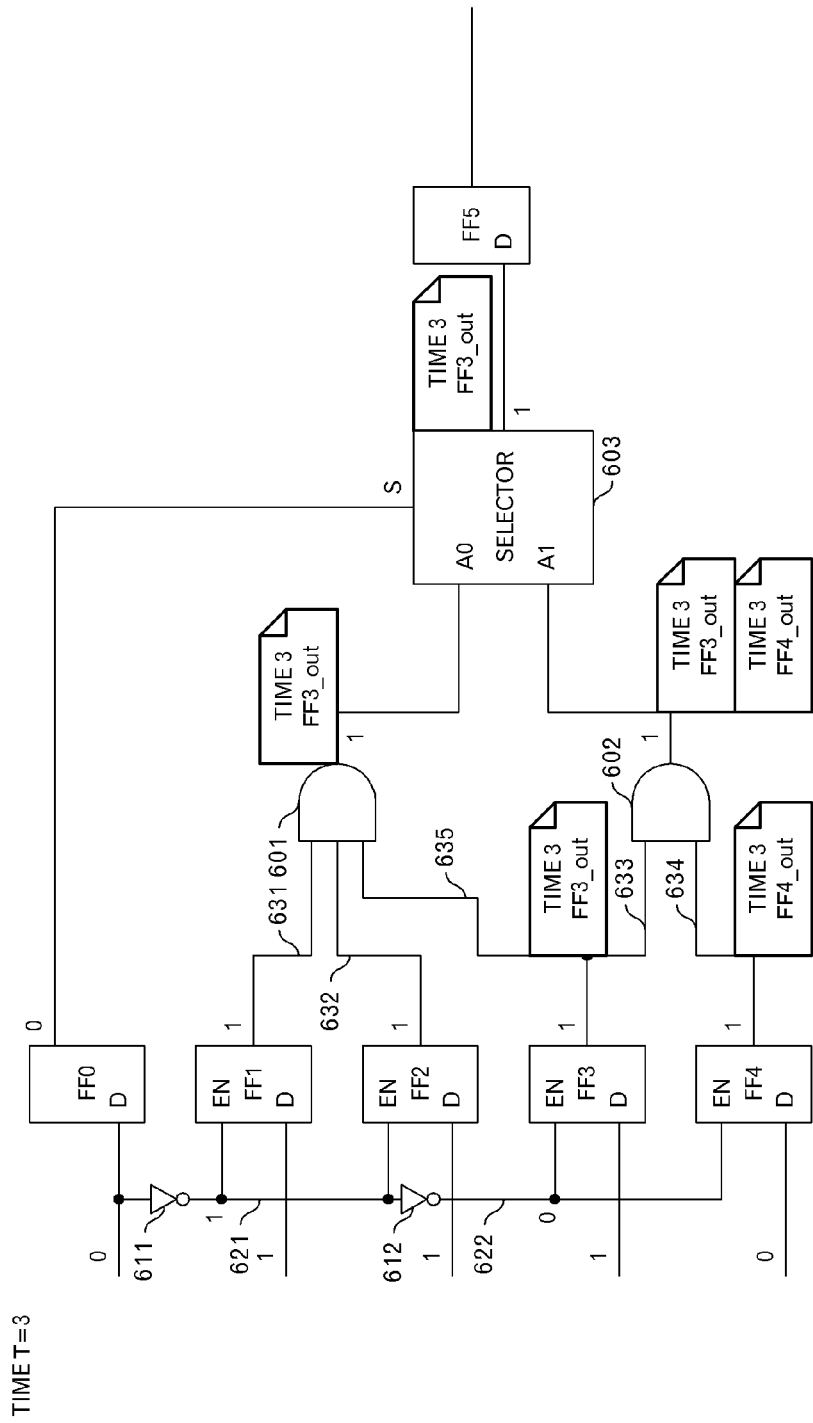
FIG. 39 is a diagram depicting a state at T=3 in the case where the incorrect circuit changes are conducted.

When the processing further progresses, two switching probability restraint information lists are propagated to the output of the AND circuit 602 as depicted in FIG. 39. Furthermore, because the output value of FF0 is "0", the input value of the A0 terminal, namely, the output value of the AND circuit 601, is selected in the selector 603, and the output value of the selector 603 is "1". At this time, the switching probability restraint information list set for the output of the AND circuit 601 is propagated to the output of the selector 603. In this circuit in which the incorrect changes are made, the switching probability restraint information list is propagated to the output of the selector 603.

Figure 40:
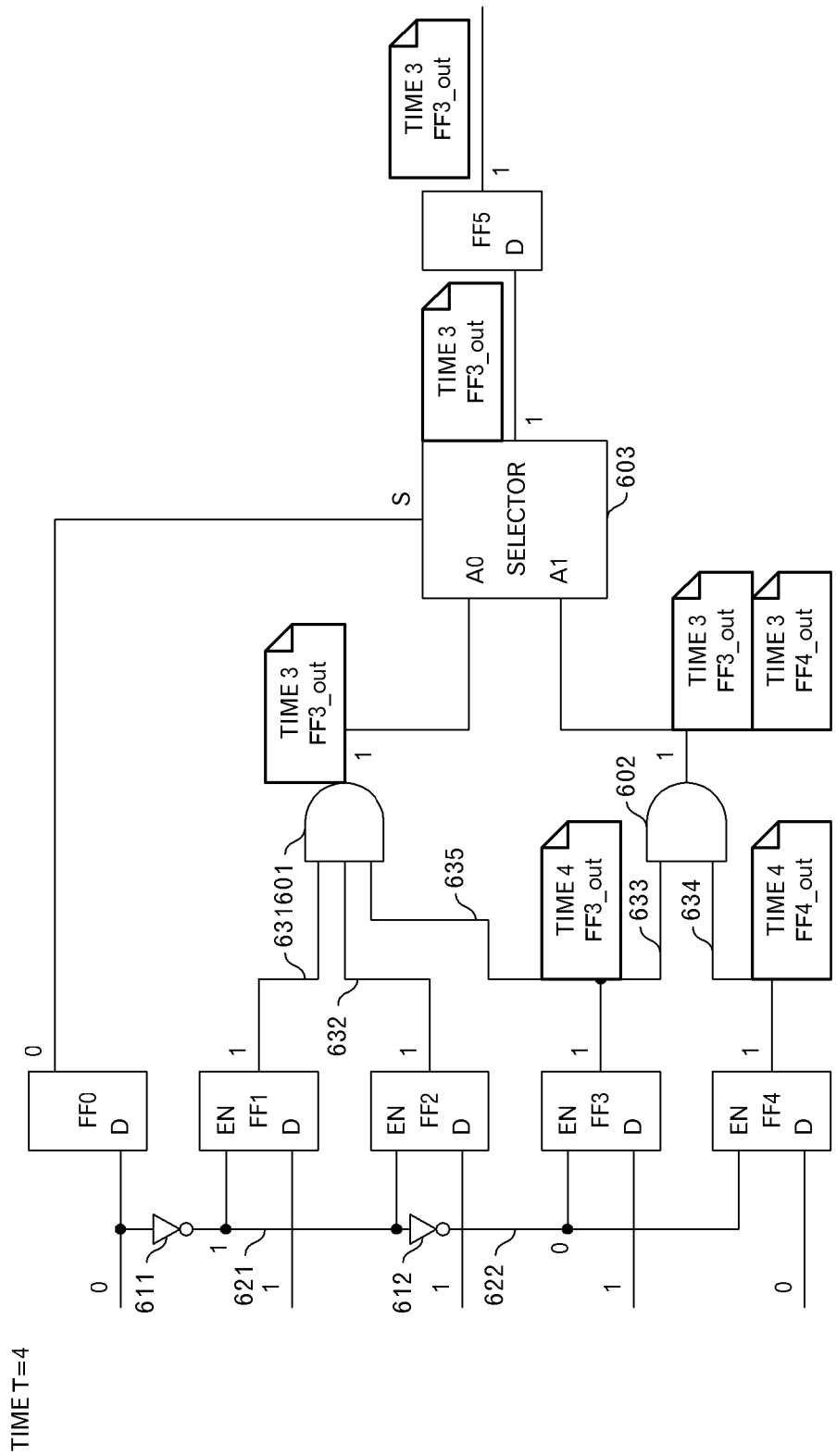
FIG. 40 is a diagram depicting a state at T=4 in the case where the incorrect circuit changes are conducted.

Furthermore, shifting to T=4, as depicted in FIG. 40, the input value "1" to the D terminal of FF5 is outputted, and the switching probability restraint information list set for the output of the selector 603 is also propagated to the output of FF5. Thus, it is possible to judge that a problem occurs.

Figure 41:
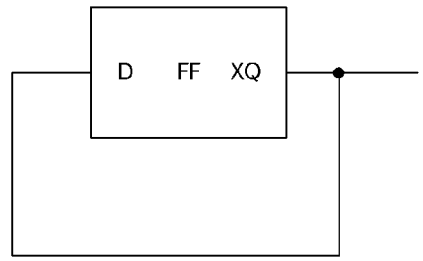
FIG. 41 is a diagram depicting a circuit example having possibility that a problem occurs when the switching probability restraint information list is deleted.

Incidentally, at the step S33 in FIG. 14, the switching probability restraint information list set for the net connected to the output pin is deleted immediately after shifting to the next cycle. However, there is an exception. For example, as depicted in FIG. 41, a case that the output of FF is directly connected to the input of FF is the exception. In the example of FIG. 41, notD is outputted to XQ. Namely, for each cycle, "0" and "1" are alternately outputted.

Figure 42:
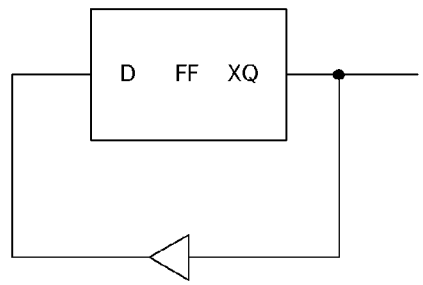
FIG. 42 is a diagram depicting an example of a method to resolve the problem when the switching probability restraint information list.

In the exception case, it is necessary to change the changed net list in advance in order not to directly connect the output of FF to the input. Namely, as depicted in FIG. 42, a buffer is connected to divide the net. Not only the example of FIG. 42, but also in a case where different FF are directly connected, the net is divided to the net, similarly.

Incidentally, the aforementioned deletion timing of the switching probability restraint information list is the most simple. However, other timing may be adopted.

In addition, if the designer designs the circuits so as to stop the propagation of the signal within the maximum number L of cycles when adding the circuits for the reduction of the power consumption, it is possible to appropriately set the maximum number L of cycles in the embodiments.

Although the embodiments were explained above, this technique is not limited to these embodiments. For example, the functional block diagram of the verification system depicted in FIG. 10 is a mere example, and does not always correspond to the actual program module configuration. Similarly, the file configuration may be changed.

In addition, as long as the processing result is the same, the steps may be executed in parallel or the order of the steps may be exchanged.

Incidentally, in the aforementioned embodiments, the switching restraint count value is counted when the switching probability restraint information list is firstly set and when it is propagated. However, the switching restraint count value may be counted only when it is firstly set, or only when it is propagated, for example.

The aforementioned embodiments can be summarized as follows: This circuit operation verification method includes, based on logic simulation results for an operation verification target circuit to which a control circuit instructing a switching restraining mode to a specific circuit is added, identifying, from a control signal data storage device storing an ID of a control signal net through which a control signal to instruct the switching restraining mode is transmitted, a signal value of the control signal, by which the switching restraining mode is enabled, and an ID of a switching restrained net through which a signal directly influenced by enabling the switching restraining mode is transmitted, in association each other, a switching restrained net for which the signal value of the control signal of the control signal net at a specific time is a signal value by which the switching restraining mode is enabled, and which corresponds to the pertinent control signal net, and setting a switching probability restraint information list including the ID of the switching restraining net and the specific time to the identified switching restrained net; identifying, from a propagation condition data storage device storing, for each type of circuits, a propagation condition by which the switching probability restraint information list set for an input side net of the circuit is propagated to an output side net of the circuit, a propagation condition for a type of a specific circuit whose input side net is a net for which the switching probability restraint information list is set, and judging whether or not the results of logic simulation satisfy the identified propagation condition, and propagating the switching probability restraint information list set for the input side net to the output side net of the specific circuit, upon detecting that the results of the logic simulation satisfy the identified propagation condition; and judging whether or not the specific time included in the switching probability restraint information list propagated to the output side net of the specific circuit is a time prior to a predetermined time or more from the present time, and upon detecting that the specific time is a time prior to the predetermined time or more from the present time, outputting an error.

Thus, by setting and propagating the switching probability restraint information list by using the result of the conventional logic simulation, the operation verification can be carried out only by preparing data stored in the control signal data storage device and managing the switching probability restraint information list.

In addition, this circuit operation verification method may further include comparing the data of the operation verification target circuit with data of a circuit before the control circuit is added to identify difference circuits, comparing, by using the difference circuits, the data of the operation verification target circuit with switching restraint circuit patterns each having the control circuit, a controlled circuit, a control signal net of the input side, which connects the control circuit with the controlled circuit and transmits the control signal, and a switching restrained net of the output side of the controlled circuit, wherein said switching restraint circuit patterns are stored in a control signal detection library storage device further storing a signal value of the control signal, in which the switching restraining mode is enabled for the switching restraint circuit pattern, and identifying the control signal net, the signal value of the control signal and the switching restraint net for a circuit pattern pertinent to the switching restraint circuit pattern in the data of the operation verification target circuit, and storing the identified data into the control signal data storage device. Thus, the data stored in the control signal data storage device can also be automatically generated, and the designer's work load is reduced.

Furthermore, the circuit operation verification method may further include counting the number of times that at least one of said setting said switching probability restraint information list and said propagating said switching probability restraint information list is carried out, and storing the count value into a switching restraint count value storage device in association with the control signal net. Thus, the upper limit of the effect of the switching restraining can be estimated.

Moreover, the circuit operation verification method may further include counting the number of times that transition of the signal value in the results of the logic simulation is observed, for the net for which different switching probability restraint information list is consecutively set, and storing the count value into a signal change count value storage device in association with that net. Thus, it becomes possible to detect the net that the signal transitions frequently and unnaturally occur, and investigate problems of the circuit.

Furthermore, the aforementioned identifying and setting may include deleting the switching probability restraint information list already set for an output side at the beginning of the processing for a specific time. Thus, it becomes possible to accurately judge the life time of the switching probability restraint information list. Incidentally, when correct circuit changes are conducted, the results of the logic simulation do not satisfy the propagation condition at an appropriate timing. Therefore, the switching probability restraint information list is deleted within a predetermined period, and no error occurs. On the other hand, when the circuit changes include any mistakes, the switching probability restraint information list is propagated continuously. Accordingly, the error is notified. When the error includes the switching probability restraint information lists relating to the error, it becomes possible to easily correct the circuit.

Incidentally, it is possible to create a program causing a computer to execute the aforementioned method, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

Figure 43:
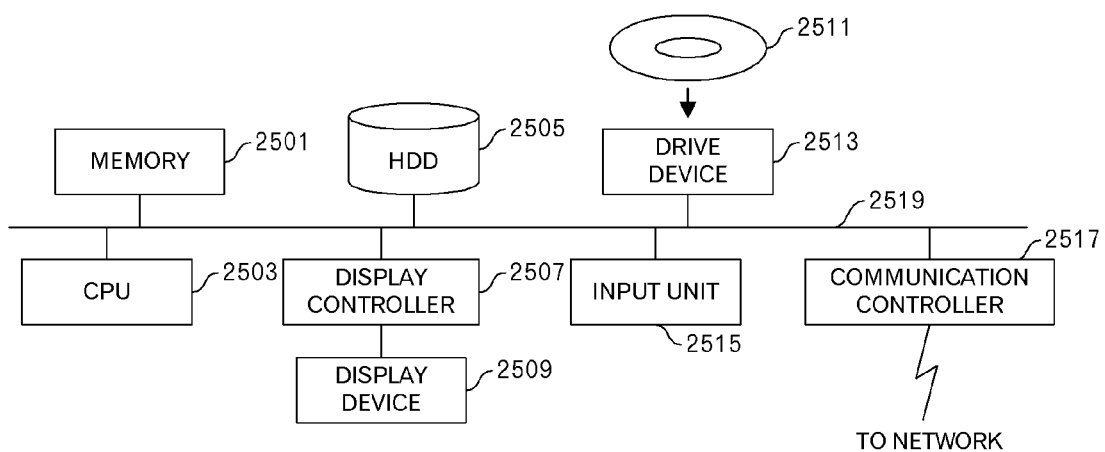
FIG. 43 is a functional block diagram of a computer.

Incidentally, the verification system is a computer device as shown in FIG. 43. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 43. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the computer-readable removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in detail are realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a circuit operation verification program for causing a computer to execute a process, comprising:

based on logic simulation results for an operation verification target circuit including a control circuit instructing a switching restraining mode to a specific circuit, identifying, from a control signal data storage device storing an ID of a control signal net through which a control signal to instruct said switching restraining mode is transmitted, a signal value of said control signal, by which said switching restraining mode is enabled, and an ID of a switching restrained net, through which a signal directly influenced by enabling said switching restraining mode is transmitted, in association each other, a switching restrained net, for which said signal value of said control signal of said control signal net at a specific time is a signal value by which said switching restraining mode is enabled, and which corresponds to the pertinent control signal net, and setting a switching probability restraint information list including said ID of the identified switching restrained net and said specific time to said identified switching restrained net;

identifying, from a propagation condition data storage device storing, for each type of the circuit, a propagation condition by which said switching probability restraint information list set for an input side net of the circuit is propagated to an output side net of the circuit, a propagation condition for a type of a specific circuit whose input side net is a net for which said switching probability restraint information list is set, and judging whether or not said results of logic simulation satisfy the identified propagation condition, and propagating said switching probability restraint information list set for said input side net to said output side net of said specific circuit, upon detecting that said results of said logic simulation satisfy said identified propagation condition; and judging whether or not said specific time included in said switching probability restraint information list propagated to said output side net of said specific circuit is a time prior to a predetermined time or more from a present time, and upon detecting that said specific time is a time prior to said predetermined time or more from said present time, outputting an error.

2. The computer-readable, non-transitory storage medium as set forth in claim 1, wherein said process further comprises:
comparing data of said operation verification target circuit with data of a circuit before said control circuit is added, to identify difference circuits, and comparing, by using said difference circuits, said data of said operation verification target circuit with switching restraint circuit patterns each having a control circuit, a controlled circuit, a control signal net of an input side, which connects said control circuit with said controlled circuit and transmits said control signal, and a switching restrained net of an output side of said controlled circuit, wherein said switching restraint circuit patterns are stored in a control signal detection library storage device further storing a signal value of said control signal, by which said switching restraining mode is enabled for said switching restraint circuit pattern; and
identifying said control signal net, said signal value of said control signal and said switching restraint net for a circuit pattern pertinent to said switching restraint circuit pattern in said data of said operation verification target circuit, and storing the identified data into said control signal data storage device.

3. The computer-readable, non-transitory storage medium as set forth in claim 1, wherein said process comprises:
counting a number of times that at least one of said setting said switching probability restraint information list and said propagating said switching probability restraint information list is carried out, and storing the count value into a switching restraint count value storage device in association with said ID of said control signal net.

4. The computer-readable, non-transitory storage medium as set forth in claim 1, wherein said process comprises:
counting a number of times that transition of said signal value in said results of said logic simulation is observed, for a net for which different switching probability restraint information lists are consecutively set, and storing the count value into a signal change count value storage device in association with the pertinent net.

5. The computer-readable, non-transitory storage medium as set forth in claim 1, wherein said identifying and setting comprises deleting said switching probability restraint information list already set for an output side, at beginning of a processing for a specific time.

6. A computer-implemented circuit operation verification method, comprising:
based on logic simulation results for an operation verification target circuit including a control circuit instructing a switching restraining mode to a specific circuit, identifying, by using a computer, from a control signal data storage device storing an ID of a control signal net through which a control signal to instruct said switching restraining mode is transmitted, a signal value of said control signal, by which said switching restraining mode is enabled, and an ID of a switching restrained net, through which a signal directly influenced by enabling said switching restraining mode is transmitted, in association with each other, a switching restrained net, for which said signal value of said control signal of said control signal net at a specific time is a signal value by which said switching restraining mode is enabled, and which corresponds to the pertinent control signal net, and setting a switching probability restraint information list including said ID of the identified switching restrained net and said specific time to said identified switching restrained net;
identifying, by using the computer, from a propagation condition data storage device storing, for each type of the circuit, a propagation condition by which said switching probability restraint information list set for an input side net of the circuit is propagated to an output side net of the circuit, a propagation condition for a type of a specific circuit whose input side net is a net for which said switching probability restraint information list is set, and judging whether or not said results of logic simulation satisfy the identified propagation condition, and propagating said switching probability restraint information list set for said input side net to said output side net of said specific circuit, upon detecting that said results of said logic simulation satisfy said identified propagation condition; and
judging, by using the computer, whether or not said specific time included in said switching probability restraint information list propagated to said output side net of said specific circuit is a time prior to a predetermined time or more from a present time, and upon detecting that said specific time is a time prior to said predetermined time or more from said present time, outputting an error.

7. A circuit operation verification apparatus, comprising:
a control signal data storage device storing an ID of a control signal net through which a control signal to instruct said switching restraining mode is transmitted, a signal value of said control signal, by which said switching restraining mode is enabled, and an ID of a switching restrained net, through which a signal directly influenced by enabling said switching restraining mode is transmitted, in association each other;
a setting unit that identifies, based on logic simulation results for an operation verification target circuit including a control circuit instructing a switching restraining mode to a specific circuit, a switching restrained net, for which said signal value of said control signal of said control signal net at a specific time is a signal value by which said switching restraining mode is enabled, and which corresponds to the pertinent control signal net, from said control signal data storage device, and sets a switching probability restraint information list including said ID of the identified switching restrained net and said specific time to said identified switching restrained net;
a propagation condition data storage device storing, for each type of the circuit, a propagation condition by which said switching probability restraint information list set for an input side net of the circuit is propagated to an output side net of the circuit;
a propagation unit that identifies, from said propagation condition data storage device, a propagation condition for a type of a specific circuit whose input side net is a net for which said switching probability restraint information list is set, and judges whether or not said results of logic simulation satisfy the identified propagation condition, and propagates said switching probability restraint information list set for said input side net to said output side net of said specific circuit, upon detecting that said results of said logic simulation satisfy said identified propagation condition; and an output unit that judges whether or not said specific time included in said switching probability restraint information list propagated to said output side net of said specific circuit is a time prior to a predetermined time or more from a present time, and upon detecting that said specific time is a time prior to said predetermined time or more from said present time, outputs an error.

* * * * *